(12) United States Patent
Akiba et al.

(10) Patent No.: US 7,280,292 B2
(45) Date of Patent: Oct. 9, 2007

(54) DRIVING CONTROL DEVICE, PORTABLE OPTICAL APPARATUS AND DRIVING CONTROL METHOD

(75) Inventors: Makoto Akiba, Saitama (JP); Hideo Yoshida, Saitama (JP)

(73) Assignee: Fujinon Corporation, Tokyo (JP)

( * ) Notice: Subject to any disclaimer, the term of this patent is extended or adjusted under 35 U.S.C. 154(b) by 0 days.

(21) Appl. No.: 11/601,688

(22) Filed: Nov. 20, 2006

(65) Prior Publication Data

US 2007/0115568 A1     May 24, 2007

(30) Foreign Application Priority Data

Nov. 21, 2005  (JP)  ............................ P2005-336138
Nov. 21, 2005  (JP)  ............................ P2005-336174
Nov. 21, 2005  (JP)  ............................ P2005-336229

(51) Int. Cl.
       *G02B 7/02*     (2006.01)
(52) U.S. Cl. ....................... 359/819; 359/811; 359/823; 359/824
(58) Field of Classification Search ................ 359/819, 359/821, 822, 823, 824, 825, 826, 811, 813, 359/814
See application file for complete search history.

(56) References Cited

U.S. PATENT DOCUMENTS 5,225,941  A     7/1993   Saito et al.
6,249,093  B1    6/2001   Takahata et al.
2004/0212721 A1  10/2004  Watanabe

FOREIGN PATENT DOCUMENTS

| JP | 63-157578 A | 6/1988 |
| JP | 2633066 B2 | 4/1997 |
| JP | 11-356070 A | 12/1999 |
| JP | 2002-72073 A | 3/2002 |
| JP | 2004-77959 A | 3/2004 |

*Primary Examiner*—Timothy Thompson
(74) *Attorney, Agent, or Firm*—Birch, Stewart, Kolasch & Birch, LLP

(57) ABSTRACT

A driving control device 20 controls supply of driving pulses to expand and contract a piezoelectric element 12 so that an expansion rate is different from a contraction rate, to vibrate a driving rod 17 and move a lens 21 frictionally engaging with the driving rod 17 in two directions. The driving control device 20 includes an actual driving pulse number measuring unit 32 that measures actual driving pulse numbers, which are required to move the lens 21 by a predetermined movement amount in the two directions, before a focusing operation of the lens 21, a correction factor calculating unit 33 that calculates correction factors relating to a driving pulse number, based on the actual driving pulse numbers and a predetermined reference pulse number; and a driving pulse number correcting unit 34 that corrects a driving pulse number supplied to the piezoelectric element 12 based on the correction factors.

11 Claims, 14 Drawing Sheets

FIG. 10

| No. | CONDITIONS | MOVEMENT DIRECTION OF LENS |
|---|---|---|
| 1 | VP > VD2 > VD1 | INF DIRECTION |
| 2 | VP > VD1 > VD2 | N DIRECTION |
| 3 | VD2 ≧ VP > VD1 | INF DIRECTION |
| 4 | VD1 ≧ VP > VD2 | N DIRECTION |

DRIVING CONTROL DEVICE, PORTABLE OPTICAL APPARATUS AND DRIVING CONTROL METHOD

BACKGROUND OF THE INVENTION

1. Technical Field

The invention relates to a driving control device using an electro-mechanical converting element, a portable optical apparatus and a driving control method.

2. Description of the Related Art

Various actuators using a piezoelectric element have been proposed in the related art. For example, an actuator using a piezoelectric element for focus driving of a lens of a camera has been proposed (refer to Japanese Patent No. 2633066 (corresponding to U.S. Pat. No. 5,225,941)). In such an actuator, it is common that supply of driving pulses to the piezoelectric element is controlled to cause the piezoelectric element to expanded and contract so that the expansion rate and contraction rate of the piezoelectric element along a predetermined direction are different, thereby vibrating a shaft member for lens driving along the predetermined direction, and minutely moving the lens, which frictionally engages with the shaft member along the predetermined direction.

However, since the actuator is configured such that the piezoelectric element is caused to expand and contract so that the expansion rate and contraction rate of the piezoelectric element along the predetermined direction are different, thereby vibrating the shaft member along the predetermined direction and minutely moving the lens which frictionally engages with the shaft member, it is difficult to move the lens just a distance, which is in proportion to a driving pulse number.

In order to improve the accuracy of the focus driving of a lens in view of the above circumstance, JP Hei. 11-356070A (corresponding to U.S. Pat. No. 6,249,093) discloses a technique in which a traveling speed of the lens is obtained by detecting a traveling distance of the lens, and the supply stop time of driving pulses for driving of the lens is controlled so that the traveling speed of the lens becomes a predetermined target speed. In this technique, since the traveling speed of the lens is obtained every moment while focus driving of the lens is performed and high-speed control by multi-tasking is performed so that the traveling speed of the lens becomes a predetermined target speed, high-precision focus driving control can be expected except for an initial stage of the control concerned.

However, since JP Hei. 11-356070A requires high-speed control by multi-tasking, a control device equipped with a multi-task CPU is needed. The high-speed control cannot be realized in a control device equipped with only an inexpensive single task CPU. Moreover, since the supply stop time of driving pulses is controlled simultaneously while focus driving of the lens is performed, high-precision focus driving control cannot be expected in the initial stage of the focus driving.

SUMMARY OF THE INVENTION

The invention has been made in view of the above circumstances and provides a driving control device and a driving control method, which can realize driving control with a predetermined accuracy or higher from an initial stage of control by using an inexpensive CPU.

According to an aspect of the invention, a driving control device includes an electro-mechanical converting element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move a driven member, which frictionally engages with the driving member, in two directions including one direction along the predetermined direction and an opposite direction to the one direction. The driving pulse control section includes an actual driving pulse number measuring unit, a correction factor calculating unit and a driving pulse number correcting unit. The actual driving pulse number measuring unit measures actual driving pulse numbers, which are respectively required to actually move the driven member by a predetermined movement amount in the two directions, before a positioning operation for positioning the driven member is started. The correction factor calculating unit calculates correction factors for correcting a relationship between a driving pulse number and a traveling distance of the driven member with respect to the respective two directions, based on the actual driving pulse numbers obtained by the measurement and a predetermined reference pulse number. The driving pulse number correcting unit corrects an element driving pulse number, which is supplied to the electro-mechanical converting element so as to move the driven member, based on the calculated correction factors for the respective two directions.

According to another aspect of the invention, a driving control method is for use in a driving control device. The driving control device includes an electro-mechanical converting element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move a driven member, which frictionally engages with the driving member, in two directions including one direction along the predetermined direction and an opposite direction to the one direction. The driving control method includes: measuring, by the driving pulse control section, actual driving pulse numbers, which are respectively required to actually move the driven member by predetermined movement amount in the two directions before a positioning operation for positioning the driven member is started; calculating, by the driving pulse control section, correction factors for correcting a relationship between the driving pulse number and a traveling distance of the driven member with respect to the respective two directions, based on the actual driving pulse numbers obtained by the measuring and a predetermined reference pulse number; and correcting, by the driving pulse control section, an element driving pulse number, which is supplied to the electro-mechanical converting element so as to move the driven member, based on the calculated correction factors for the respective two directions.

Although the "predetermined movement amount" mainly means a predetermined distance, the "predetermined movement amount" may be a predetermined driving pulse number.

According to the above driving control device and driving control method, the driving pulse control section measures an actual driving pulse numbers, which are required to actually move the driven member by predetermined movement amount in the two directions, before the positioning operation for positioning the driven member is started, and calculates a correction factor for correcting the relationship between the driving pulse number and the traveling distance of the driven member with respect to each of the two directions based on the actual driving pulse numbers obtained by the measurement and the predetermined reference pulse number. Also, the driving pulse control section corrects the element driving pulse number, which is supplied to the electro-mechanical converting element so as to move the driven member, based on the calculated correction factors for the respective two directions.

As such, the number of actual driving pulses, which is to be supplied to the electro-mechanical converting element in order to move the driven member, is corrected before the start of the positioning operation rather than while the positioning operation is being operated. Therefore, driving control can be realized by an inexpensive CPU configuration without requiring a CPU having multi-tasking capability unlike the related art, which controls the element driving pulse number every moment while the positioning operation is being performed. Moreover, since the correction of the element driving pulse number is completed before the start of a positioning operation, the driving control with the predetermined accuracy or higher can be realized from the initial stage of the positioning operation.

Also, the driving pulse control section of the drive control device may further include a correction determining unit. The correction determining unit determines whether or not it is necessary to correct the driving pulse number according to a temperature change, based on a predetermined reference value and a predetermined factor, which has a correlation with a divergence between the actual driving pulse numbers and the predetermined reference pulse number, which is obtained from the actual driving pulse numbers with respect to the respective two directions and the predetermined reference pulse number. The driving pulse number correcting unit may correct the element driving pulse number according to a predetermined temperature change when the correction determining unit determines that it is necessary to correct the driving pulse number according to the temperature change.

Also, the drive control method may further include: determining, by the driving pulse control section, whether or not it is necessary to correct the driving pulse number according to a temperature change, based on a predetermined reference value and a predetermined factor, which has a correlation with a divergence between the actual driving pulse numbers and the predetermined reference pulse number, which is obtained from the actual driving pulse numbers with respect to the respective two directions and the predetermined reference pulse number; and correcting, by the driving pulse control section, the element driving pulse number according to a predetermined temperature change when it is determined that it is necessary to correct the driving pulse number according to the temperature change.

As such, it is determined whether or not whether or not it is necessary to correct the driving pulse number according to a temperature change. Then, when it is determined that it is necessary to correct the driving pulse number according to the temperature change, the element driving pulse number is corrected according to a predetermined temperature change. Thereby, more highly-accurate driving control can be realized.

Also, the driven member may include a lens. The predetermined direction may be an optical axis direction of the lens. That is, the driving control device and driving control method may be applied to driving control of the lens in positioning the lens along the optical axis direction.

According to the above configuration, the driving control with a predetermined accuracy or higher can be realized from the initial stage of control by using an inexpensive CPU configuration.

According to still another aspect of the invention, a driving control device includes an electro-mechanical converting element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens. The driving pulse control section includes a forward measuring unit, a backward movement controlling unit, a backward measuring unit and a movement direction determining unit. The forward measuring unit measures predetermined AF evaluation values acquired from images captured through the lens whenever the driven member is moved, while moving the driven member by a predetermined driving pulse number at a time in a driving direction in which the driven member is moved in a focusing operation of the lens. The backward movement controlling unit controls the supply of driving pulses so as to return the driven member in a reverse direction towards a position where a maximum value of the AF evaluation values is obtained by the forward measuring unit. The backward measuring unit measures an AF evaluation value in a position which the driven member is returned to and stopped at by the backward movement controlling unit. The backward measuring unit measures AF evaluation values whenever the driven member is moved, while moving the driven member from the position in the reverse direction by the predetermined driving pulse number a predetermined number of times. The movement direction determining unit determines under a predetermined condition whether a movement direction of the driven member, which is to be used when AF evaluation values are measured again, is either the driving direction or the reverse direction, based on the maximum value of the AF evaluation values acquired by the forward measuring unit and the AF evaluation values acquired by the backward measuring unit. The forward measuring unit or the backward measuring unit performs measurement again based on the determined movement direction from a position to which the backward measuring unit has moved the driven member.

According to still another aspect of the invention, a driving control method is for use in a driving control device. The drive control device includes an electro-mechanical element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens. The driving control method includes: measuring, by the driving pulse control section, predetermined AF evaluation values acquired from images captured through the lens whenever the driven member is moved, while moving the driven member by a predetermined driving pulse number at a time in a driving direction in which the driven member is moved in a focusing operation of the lens; controlling, by the driving pulse control section, the supply of driving pulses so as to return the driven member in a reverse direction towards a position where a maximum value of the AF evaluation values is obtained in the measuring; measuring, by the driving pulse control section, an AF evaluation value in a position which the driven member is returned to and stopped at; measuring, by the driving pulse control section, AF evaluation values whenever the driven member is moved while moving the driven member from the position in the reverse direction by the predetermined driving pulse number a predetermined number of times; determining, by the driving pulse control section, under a predetermined condition whether a movement direction of the driven member, which is to be used when AF evaluation values are measured again, is either the driving direction or the reverse direction, based on the maximum value of the AF evaluation values acquired in the measuring of the AF evaluation values while moving the driven member in the driving direction and the AF evaluation values acquired in the measuring of the AF evaluation values while moving the driven member in the reverse direction, and measuring, by the driving pulse control section, the AF evaluation value again whenever the driven member is moved while moving the driven member in the determined moved direction by the predetermined pulse number at a time from a position to which the driven member has been moved in the measuring of the AF evaluation value while moving the driven member in the reverse direction.

The "AF evaluation value" means an evaluation value used in the focusing operation of the lens, for example, such as a contrast value acquired from an image captured through the lens. As the AF evaluation value is higher, the degree of focusing is evaluated as being higher.

According to the above driving control device or driving control method, the driving pulse control section measures the predetermined AF evaluation values whenever the driven member is moved, while moving the driven member by the predetermined driving pulse number at a time in the driving direction. The driving pulse control section controls the supply of the driving pulses so as to return the driven member in the reverse direction towards the position where the maximum value of the AF evaluation values, which are obtained in moving the driven member in the driving direction, is obtained. The driving pulse control section measures an AF evaluation value in a position which the driven member is returned to and stopped at. The driving pulse control section measures AF evaluation values whenever the driven member is moved while moving the driven member from the position in the reverse direction by the predetermined driving pulse number a predetermined number of times. The driving pulse control section determines under a predetermined condition whether a movement direction of the driven member, which is to be used when AF evaluation values are measured again, is either the driving direction or the reverse direction, based on the maximum value of the AF evaluation values, which are obtained in moving the driven member in the driving direction, and the AF evaluation values, which are obtained in moving the driven member in the reverse direction. The driving pulse control section measures AF evaluation value again whenever the driven member is moved, while moving the driven member in the determined direction by the predetermined driving pulse number from a position to which the backward measuring unit has moved the driven member.

As such, it is determined under the predetermined condition whether the movement direction of the driven member, which is to be used when AF evaluation values are measured again, is either the driving direction or the reverse direction, based on the maximum value of the AF evaluation values, which are obtained in moving the driven member in the driving direction, and the AF evaluation values, which are obtained in moving the driven member in the reverse direction. Then, the AF evaluation values are measured again. Thereby, a peak position of the AF evaluation values can be pinpointed more surely. Therefore, the AF search with high accuracy can be realized even at the time of low luminance and/or low contrast.

According to the above configuration, the AF search with high accuracy can be realized even at the time of low luminance and/or low contrast.

According to still further another aspect of the invention, a driving control device includes an electro-mechanical converting element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens. The driving pulse control section includes an actual driving pulse number measuring unit, a correction factor calculating unit, an AF evaluation value measuring unit, a correcting unit, a light-measuring unit and a movement controlling unit. The actual driving pulse number measuring unit measures an actual driving pulse number, which is required to actually move the driven member by a predetermined traveling distance in a reverse direction opposite to a driving direction of the driven member for a focusing operation of the lens, before the focusing operation of the lens is started. The correction factor calculating unit calculates a correction factor for correcting a relationship between a driving pulse number and a traveling distance of the driven member with respect to the reverse direction, based on the actual driving pulse number obtained by the measurement and a predetermined reference pulse number. The AF evaluation value measuring unit measures predetermined AF evaluation values acquired from images captured through the lens whenever the driven member is moved while moving the driven member in the driving direction by a predetermined driving pulse number at a time in the driving direction for the focusing operation of the lens. The correcting unit corrects a movement pulse number corresponding to a traveling distance from a position where a maximum value of the AF evaluation values acquired by the measurement is obtained to a position where the AF evaluation value measuring unit starts to re-measure, based on the correction factor calculated by the correction factor calculating unit, to thereby obtain a pulse number for re-measurement. The light-measuring unit measures a luminance of a photographic subject. The movement controlling unit controls the supply of the driving pulses so as to return the driven member in the reverse direction from the position where the maximum value of the AF evaluation values acquired by the measurement by the AF evaluation value measuring unit is obtained based on the pulse number for re-measurement obtained in the correcting by the correcting unit when a previous measurement by the AF evaluation value measuring unit has succeeded; a time, which has elapsed since success of the previous measurement by the AF evaluation value measuring unit, is within a predetermined time; and a at least one of a first condition that a change in an AF evaluation value acquired at the time of the measurement success is within a first predetermined range and a second condition that a change in the luminance obtained by measurement by the light-measuring unit at the time of the measurement success is within a second predetermined range is satisfied. The AF evaluation value measuring unit measures the predetermined AF evaluation values again from a position to which the driven member is returned after the driven member has been returned in the reverse direction by the movement controlling unit.

According to still further another aspect of the invention, a driving control method is for use in a driving control device. The driving control device includes an electro-mechanical converting element, a driving member and a driving pulse control section. The electro-mechanical converting element expands and contracts along a predetermined direction. The driving member is fixed to an end of the electro-mechanical converting element in the predetermined direction. The driving pulse control section controls supply of driving pulses to the electro-mechanical converting element. The driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens. The driving control method includes: measuring, by the driving pulse control section, an actual driving pulse number, which is required to actually move the driven member by a predetermined traveling distance in a reverse direction opposite to a driving direction of the driven member for a focusing operation of the lens, before the focusing operation of the lens is started; calculating, by the driving pulse control section, a correction factor for correcting a relationship between a driving pulse number and a traveling distance of the driven member with respect to the reverse direction, based on the actual driving pulse number obtained in the measuring and a predetermined reference pulse number; measuring, by the driving pulse control section, predetermined AF evaluation values acquired from images captured through the lens whenever the driven member is moved while moving the driven member in the driving direction by a predetermined driving pulse number at a time in the driving direction for the focusing operation of the lens; correcting, by the driving pulse control section, a movement pulse number corresponding to a traveling distance from a position where a maximum value of the AF evaluation values acquired in the measuring of the AF evaluation values is obtained to a position where re-measuring of the AF evaluation value measuring unit is started, based on the correction factor calculated in the calculating, to thereby obtain a pulse number for re-measurement; measuring, by the driving pulse control section, a luminance of a photographic subject; and controlling, by the driving pulse control section, the supply of the driving pulses so as to return the driven member in the reverse direction from the position where the maximum value of the AF evaluation values acquired in the measuring of the AF evaluation values is obtained based on the pulse number for re-measurement obtained in the correcting when a previous measuring of the AF evaluation value has succeeded; a time, which has elapsed since success of the previous measuring of the AF evaluation value, is within a predetermined time; and a at least one of a first condition that a change in an AF evaluation value acquired at the time of the measurement success is within a first predetermined range and a second condition that a change in the luminance obtained in the measuring of the luminance at the time of the measurement success is within a second predetermined range is satisfied; and measuring, by the driving pulse control section, the predetermined AF evaluation values again from a position to which the driven member is returned after the driven member has been returned in the reverse direction in the controlling.

According to the above driving control device or driving control method, the driving pulse control section measures the actual driving pulse number, which is required to actually move the driven member by the predetermined traveling distance in the reverse direction opposite to the driving direction of the driven member for the focusing operation of the lens, before the focusing operation of the lens is started. The driving pulse control section calculates the correction factor for correcting the relationship between a driving pulse number and the traveling distance of the driven member with respect to the reverse direction, based the actual driving pulse number obtained in the measuring and the predetermined reference pulse number. The driving pulse control section measures the predetermined AF evaluation values acquired from images captured through the lens whenever the driven member is moved while moving the driven member in the driving direction by the predetermined driving pulse number at a time in the driving direction for the focusing operation of the lens. The driving pulse control section corrects the movement pulse number corresponding to the traveling distance from the position where the maximum value of the AF evaluation values acquired in the measuring of the AF evaluation values is obtained to the position where the re-measuring of the AF evaluation value measuring unit is started, based on the correction factor calculated by the driving pulse control section, to thereby obtain a pulse number for re-measurement. The driving pulse control section measures a luminance of a photographic subject. The driving pulse control section controls the supply of the driving pulses so as to return the driven member in the reverse direction from the position where the maximum value of the AF evaluation values acquired in the measuring of the AF evaluation values is obtained based on the pulse number for re-measurement obtained in the correcting when a previous measuring of the AF evaluation value has succeeded; a time, which has elapsed since success of the previous measuring of the AF evaluation value, is within a predetermined time; and a at least one of a first condition that a change in an AF evaluation value acquired at the time of the measurement success is within a first predetermined range and a second condition that a change in the luminance obtained in the measuring of the luminance at the time of the measurement success is within a second predetermined range is satisfied. The driving pulse control section measures the predetermined AF evaluation values again from the position to which the driven member is returned after the driven member has been returned in the reverse direction.

Thus, the driven member is returned in the reverse direction from the position where the maximum value of AF evaluation values is obtained, on the basis of the pulse number for re-measurement. Then, the predetermined AF evaluation values are re-measured from the position to which the lens is returned. As a result, since the driving range of the driven member can be narrowed compared with the case where the driven member is returned to a starting position of the focusing operation, the driving time required for execution of the focus driving of the driven member can be shortened.

Also, a portable optical apparatus, such as a cellular phone unit with a camera, may include the above-mentioned driving control device. According to this configuration, since the driving time required for execution of the focus driving of the driven member is shortened even in such a portable optical apparatus, the convenience of such a portable optical apparatus is enhanced.

According to the above configuration, the driving time required for execution of the focus driving of the driven member can be shortened.

BRIEF DESCRIPTION OF THE DRAWINGS

FIG. 10 is a table showing the conditions under which a movement direction determining unit 135 determines the movement direction of the lens.

DETAILED DESCRIPTION OF EMBODIMENTS

First Embodiment

Hereinafter, a first embodiment according to the invention will be described with reference to FIGS. 1 to 6.

[Schematic Configuration of Driving Control Device]

Figure 1:
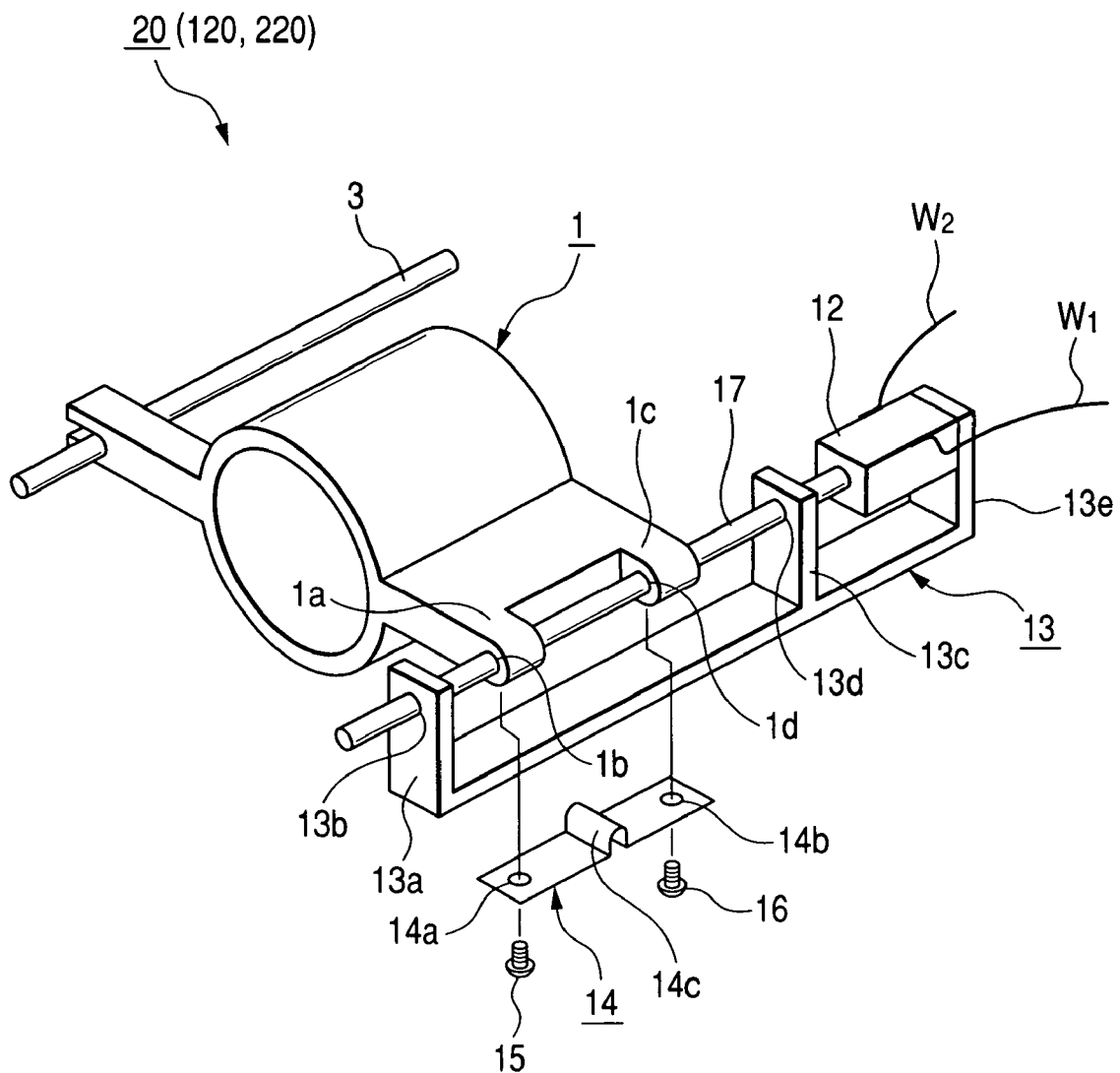
FIG. 1 is an exploded perspective view showing an example of a driving control device 20 according to a first embodiment.

FIG. 1 shows an exploded perspective view of a driving control device 20 according to the first embodiment of the invention. In FIG. 1, the driving control device 20 includes a lens barrel 1 in which a lens 21 (FIG. 2) serving as a driven member is built, and a guide bar 3, which supports the lens barrel 1 and guides the lens barrel 1 along an optical axis direction of the lens 21. A driving rod 17 moves the lens barrel 1 in an axial direction while serving as a lens barrel supporting member, which supports the lens barrel 1. The driving rod 17 is inserted into a hole 1b of a left protrusion 1a of the lens barrel 1 and a hole 1d of a protrusion 1c of the lens barrel. The driving rod 17 is inserted into a hole 13b of a first upright part 13a and a hole 13d of a second upright part 13c which are formed in the driving rod supporting member 13 so as to be movable in the axial direction. Moreover, the driving rod 17 protrudes further rearward than the second upright part 13c of the driving rod supporting member 13, and a rear end of the driving rod is fixed to a front end of a piezoelectric element 12 whose rear end is fixed to a third upright part 13e of the driving rod supporting member 13.

Vertical screw holes are formed in the bottom surfaces of the protrusions 1a and 1c, respectively, of the lens barrel 1. A rectangle leaf spring 14 has clearance holes 14a and 14b, which coincide with the positions of the screw holes of the lens barrel 1, respectively, and which are formed at both ends thereof. The rectangle leaf spring 14 is attached to the bottom surfaces of the protrusions 1a and 1c by screws 15 and 16 so that the leaf spring 14 is in parallel to the driving rod 17. An upwardly protruding curved part 14c is formed in the center of the leaf spring 14, and the curved part 14c is brought into pressure contact with the bottom surface of the driving rod 17 in an intermediate position between the protrusions 1a and 1c. For this reason, the driving rod 17 is biased upwardly in the hole 1b of the protrusion 1a and the hole 1d of the protrusion 1c, and an upper outer peripheral surface of the driving rod 17 is brought into pressure contact with upper inner peripheral surfaces of the holes 1b and 1 by the resilient force of the leaf spring 14. Accordingly, the lens barrel 1 and the driving rod 17 move integrally when an axial force below a frictional force between the holes 1b, 1d and the driving rod 17 and below a frictional force between the curved part 14c and the driving rod 17 is applied to the driving rod 17. On the other hand, only the driving rod 17 becomes movable axially when an axial force exceeding the frictional forces is applied to the driving rod 17. In addition, w1 and w2 are lead wires for supplying electric power to the piezoelectric element 12.

Next, the operation of the leaf spring 14, which frictionally engages the driving rod 17 and the lens barrel 1, will be described. The elastic force of the leaf spring 14 is applied to the driving rod 17 substantially perpendicularly thereto in order to stably generate a frictional force and to prevent an elastic force by the leaf spring 14 from acting on the lens barrel 1 in a displacement direction thereof. Furthermore, when the leaf spring 14 is elastically deformed in the direction of expansion and contraction of the piezoelectric element 12 by expansion and contraction of the piezoelectric element 12, the frictional force between the driving rod 17 and the lens barrel 1 will change, the elastic force further acts on the displacement direction of the lens barrel 1, and the displacement of the lens barrel 1 becomes unstable. In order to prevent this, the leaf spring 14 have a flat surface part parallel to the direction of expansion and contraction of the piezoelectric element 12 so as to have great rigidity in this direction.

[Functional Configuration of Driving Control Device]

Figure 2:
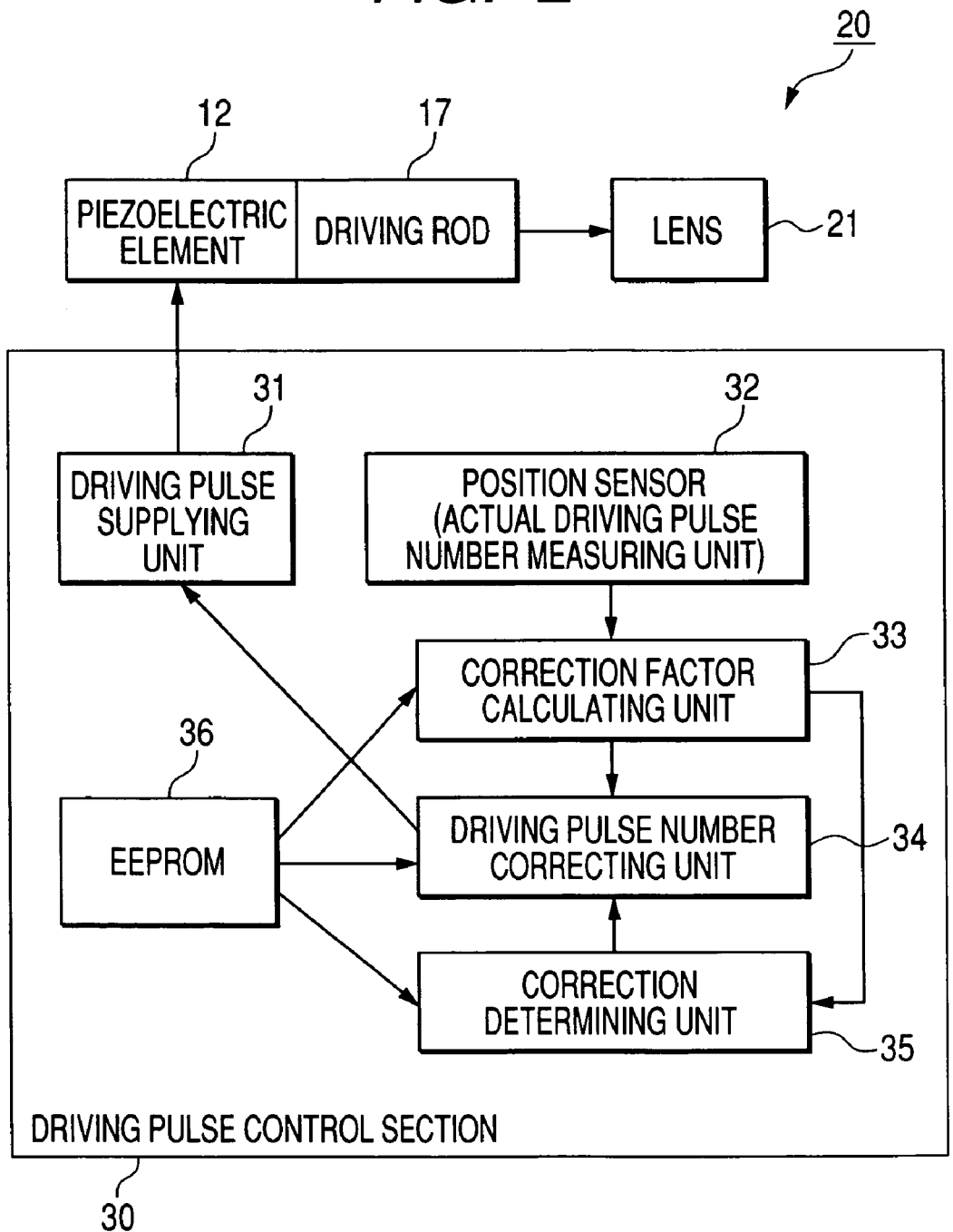
FIG. 2 is a functional block diagram of the driving control device 20.

FIG. 2 shows a functional block diagram of the driving control device 20. As shown in FIG. 2, the driving control device 20 includes the lens 21 built in the lens barrel 1 of FIG. 1, the driving rod 17 for adjusting the position of the lens 21 along the direction of the optical axis, the piezoelectric element 12, which is connected to the driving rod 17 to move this driving rod 17 along the direction of the optical axis, and a driving pulse control section 30, which controls supply of driving pulses to the piezoelectric element 12. Among these elements, the driving pulse control section 30 controls the supply of the driving pulses to cause the piezoelectric element 12 to expanded and contract so that the expansion rate of the piezoelectric element 12 along the direction of the optical axis is different from the contraction rate of the piezoelectric element 12 along the direction of the optical axis, to thereby vibrate the driving rod 17 along the direction of the optical axis and move the lens barrel 1 (and built-in lens 21) in certain directions. One of the certain directions may be referred as "N direction" in which the lens barrel 1 approaches a photographic subject along the direction of the optical axis. The other of the certain directions may be referred to as "INF direction" in which the lens barrel moves away from the photographic subject The lens barrel 1 frictionally engages with the driving rod 17.

Moreover, the driving pulse control section 30 includes a photo-interrupter (not shown), which is known in related art. Also, the driving pulse control section 30 includes a position sensor 32, which detects the position of the lens 21 on the basis of an output signal (hereinafter referred to as "PI output") from the photo-interrupter. The PI output, shown in FIG. 3 as an example, is represented by a graph including a region A and a region D, which are H zones, and a region B and a region C, which are L zones. The position sensor 32 has a function as an actual driving pulse number measuring unit, which measures pulse numbers (pulse numbers (hereinafter referred to as "actual driving pulse numbers") which are required to actually move the lens 21 in the respective N and INF directions by a predetermined distance) corresponding to the region A of FIG. 3, with respect to the driving direction (here, the N direction of FIG. 3) of the lens 21 in the focusing operation thereof, and a direction (i.e., the INF direction) opposite to the driving direction before the start of the focusing operation of the lens 21.

In addition, the driving pulse control section 30 includes a driving pulse supplying unit 31, an EEPROM 36, a correction factor calculating unit 33, a driving pulse number correcting unit 34 and a correction determining unit 35. The driving pulse supplying unit 31 supplies driving pulses to the piezoelectric element 12. The EEPROM 36 stores various predetermined values, such as a reference pulse number for calculation of a correction factor as will be described later. The correction factor calculating unit 33 calculates a correction factor for correcting the relationship between the driving pulse number and the traveling distance of the lens 21 with respect to each of the N direction and the INF direction, on the basis of the actual driving pulse number and the predetermined reference pulse number. The driving pulse number correcting unit 34 corrects, on the basis of the calculated correction factor, the number of driving pulses to be supplied to the piezoelectric element 12 in order to move the lens 21. The correction determining unit 35 obtains a factor (temperature measurement factor), which has a correlation with a divergence between the actual driving pulse number and the reference pulse number from the actual driving pulse number and the predetermined reference pulse number with respect to each of the N direction and the INF direction. The correction determining unit 35 determines whether or not it is necessary to correct the driving pulse number according to a temperature change, on the basis of the temperature measurement factor and a predetermined reference value. Of course, in the case where the correction determining unit 35 determines that it is necessary to correct the driving pulse number according to a temperature change, the driving pulse number correcting unit 34 corrects the driving pulse number according to the temperature change as will be described later.

[Processing Operation in Driving Control Device]

Next, a processing operation performed in the driving control device 20 will be described. FIG. 4 shows a basic processing operation. As shown in FIG. 4, first, the position sensor 32 measures an actual driving pulse number corresponding to the region A of FIG. 3 with respect to each of the N direction and the INF direction before the focusing operation of the lens 21 is started, in Step S1. That is, the position sensor 32 first measures an actual driving pulse number in the N direction with respect to the region A of FIG. 3, and then measures an actual driving pulse number in the INF direction with respect to the region A.

Figure 3:
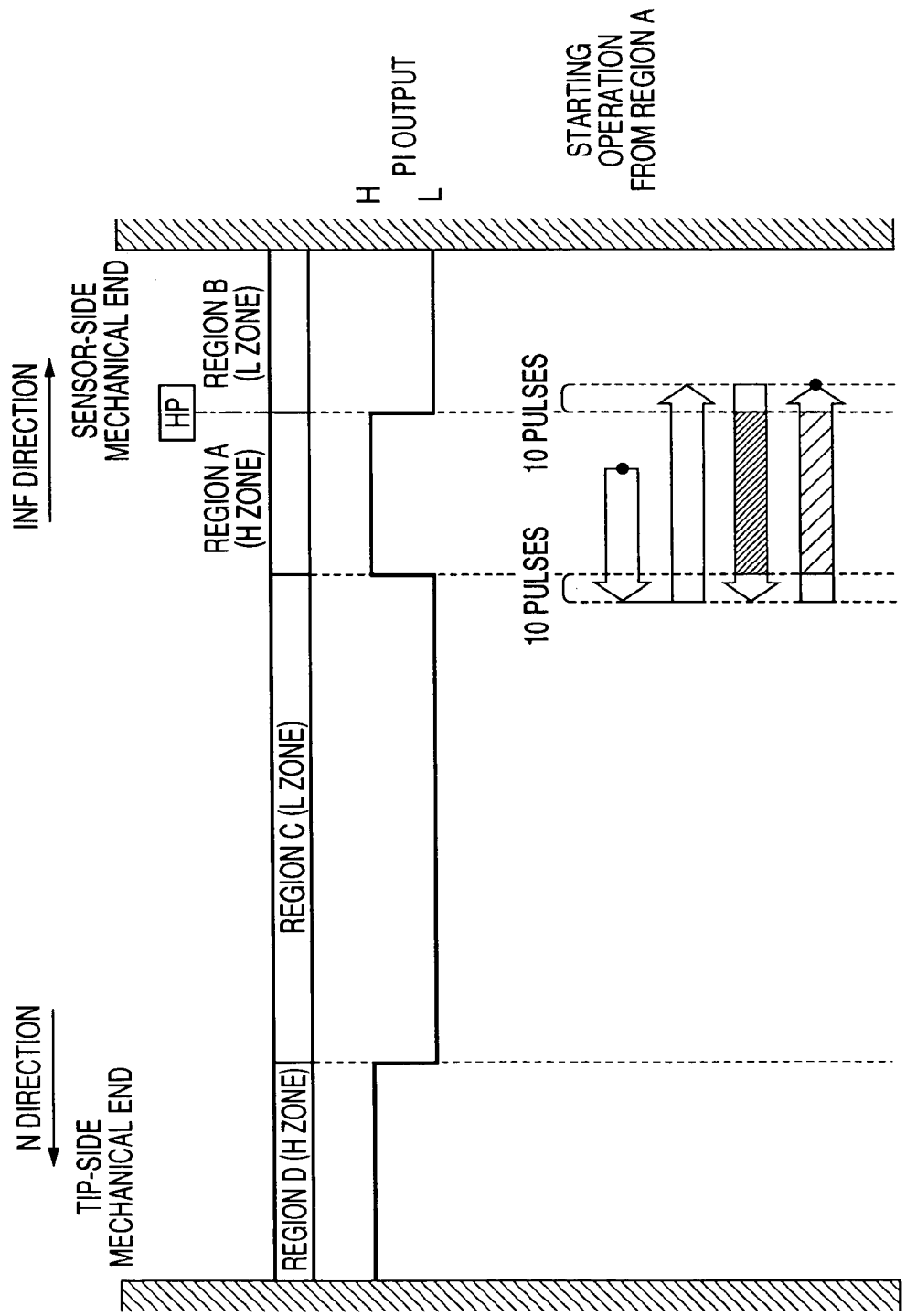
FIG. 3 is a graph showing an output signal from a photo-interrupter included in a position sensor 32 (132, 232).
Figure 4:
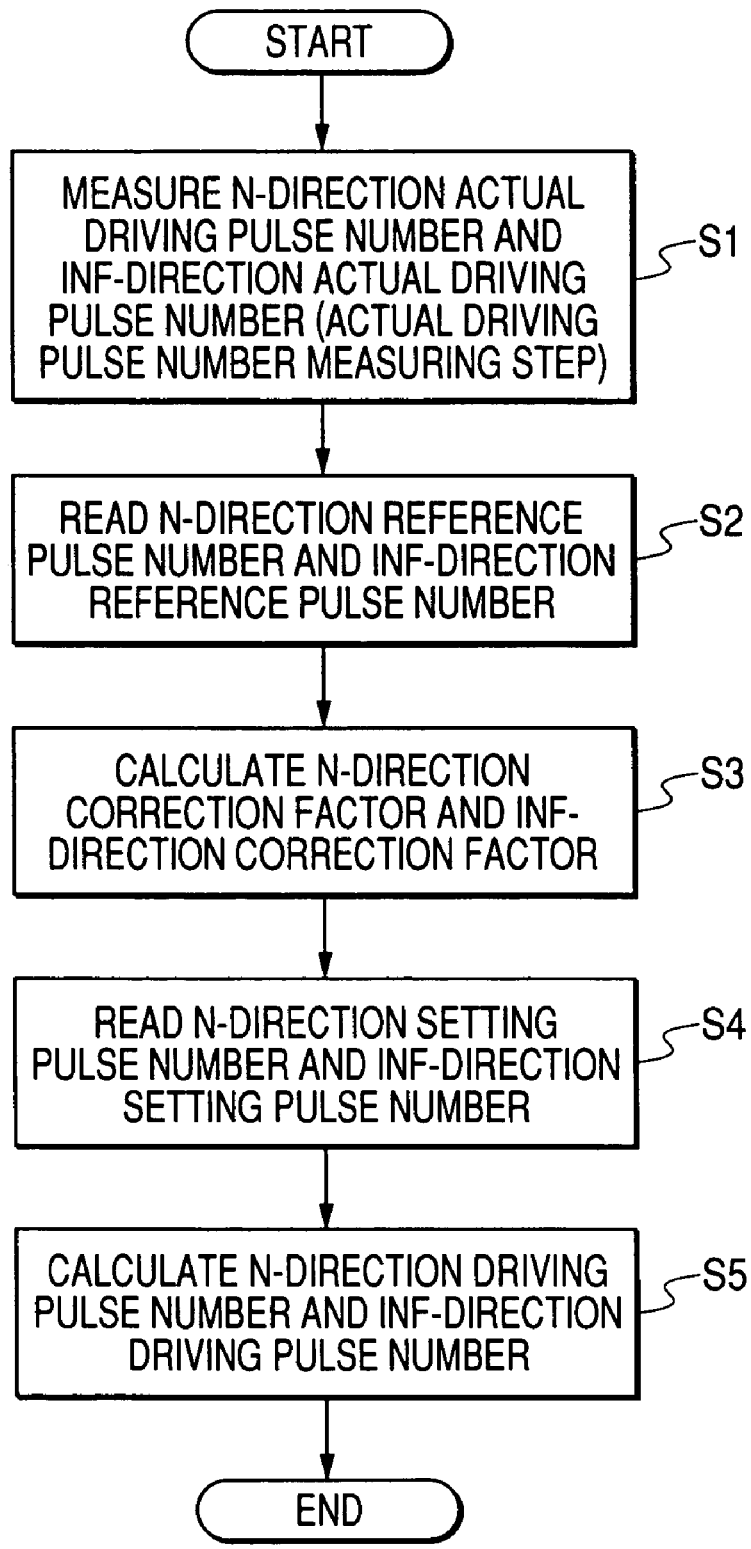
FIG. 4 is a flow diagram showing a basic processing operation in the driving control device 20.

Specifically, as shown in FIG. 3, in the case where positions to be measured by the position sensor 32 at the concerned point of time fall within the region A of the PI output, the driving pulse control section 30 starts supply of the driving pulses to the piezoelectric element 12 so as to move the lens 21 in the N direction. If the position sensor 32 detects falling (switching to the region C from the region A) from H to L in the PI output, the driving pulse control section 30 stops the supply of the driving pulses at the time when a predetermined number of driving pulses are supplied (for example, ten pulses) from the falling position. Thereafter, the driving pulse control section 30 starts supply of the driving pulses to the piezoelectric element 12 so as to move the lens 21 in the INF direction. If the position sensor 32 detects falling (switching to the region B from the region A) from H to L in the PI output, the driving pulse control section 30 stops the supply of the driving pulses at the time when the predetermined number of driving pulses are supplied (for example, ten pulses) from the falling position. Next, the driving pulse control section 30 starts supply of the driving pulses to the piezoelectric element 12 so as to move the lens 21 in the N direction, and the position sensor 32 starts counting an actual driving pulse number when detecting rising (switching to the region A from the region B) from L to H in the PI output. Thereafter, the position sensor 32 ends counting of the actual driving pulse number when detecting falling (switching to the region C from the region A) from H to L in the PI output. By doing so, an actual driving pulse number $P1_N$ in the N direction is measured. Similarly, after the driving pulse control section 30 starts supply of the driving pulses to the piezoelectric element 12 so as to move the lens 21 in the INF direction, the position sensor 32 starts counting an actual driving pulse number when detecting rising (switching to the region A from the region C) from L to H in the PI output. Thereafter, the position sensor 32 ends counting the actual driving pulse number when detecting falling (switching to the region B from the region A) from H to L in the PI output. By doing so, an actual driving pulse number $P1_{INF}$ in the INF direction is measured.

In FIG. 4, in the next Step S2, the correction factor calculating unit 33 reads from the EEPROM 36 an N-direction reference pulse number $P2_N$ and an INF-direction reference pulse number $P2_{INF}$, which are obtained in advance in a room temperature with a normal position. In the next Step S3, the correction factor calculating unit 33 calculates a correction factor $K_N$ relating to a driving pulse number in the N direction, and a correction factor $K_{INF}$ relating to a driving pulse number in the INF direction on the basis of the following formulas (1) and (2).

$$K_N = P1_N/P2_N \tag{1}$$

$$K_{INF} = P1_{INF}/P2_{INF} \tag{2}$$

In the next Step S4, the driving pulse number correcting unit 33 reads from the EEPROM 36 an N-direction setting pulse number $P3_N$ and an INF-direction setting pulse number $P3_{INF}$, which are set in advance. In the next Step S5, the driving pulse number correcting unit 34 calculates an N-direction driving pulse number $P4_N$ and an INF-direction driving pulse number $P4_{INF}$ on the basis of the following formulas (3) and (4).

$$P4_N = P3_N \times K_N \tag{3}$$

$$P4_{INF} = P3_{INF} \times K_{INF} \tag{4}$$

Accordingly, the N-direction driving pulse number $P4_N$ and the INF-direction driving pulse number $P4_{INF}$ are obtained. Hereinafter, in the focusing operation of the lens 21, the above N-direction driving pulse number $P4_N$ and INF-direction driving pulse number $P4_{INF}$ are used.

As such, the driving control device 20 corrects the number of driving pulses to be supplied to the piezoelectric element 12 in order to move the lens 21 before the start of the focusing operation rather than while the focusing operation of the lens 21 is being performed. Therefore, driving control can be realized by using an inexpensive CPU configuration without requiring a CPU having multi-tasking capability unlike a related art, which controls a driving pulse number every moment while performing a focusing operation performed. Moreover, since the correction of the driving pulse number is completed before the start of the focusing operation, driving control with the predetermined accuracy or higher can be realized from an initial stage of the focusing operation.

In addition, Step S1 of FIG. 4 may serves as an actual driving pulse number measuring step, and Step S2 and Step S3 may serve as a correction factor calculating step, and Step S4 and Step S5 may serve as a driving pulse number correcting step.

Figure 5:
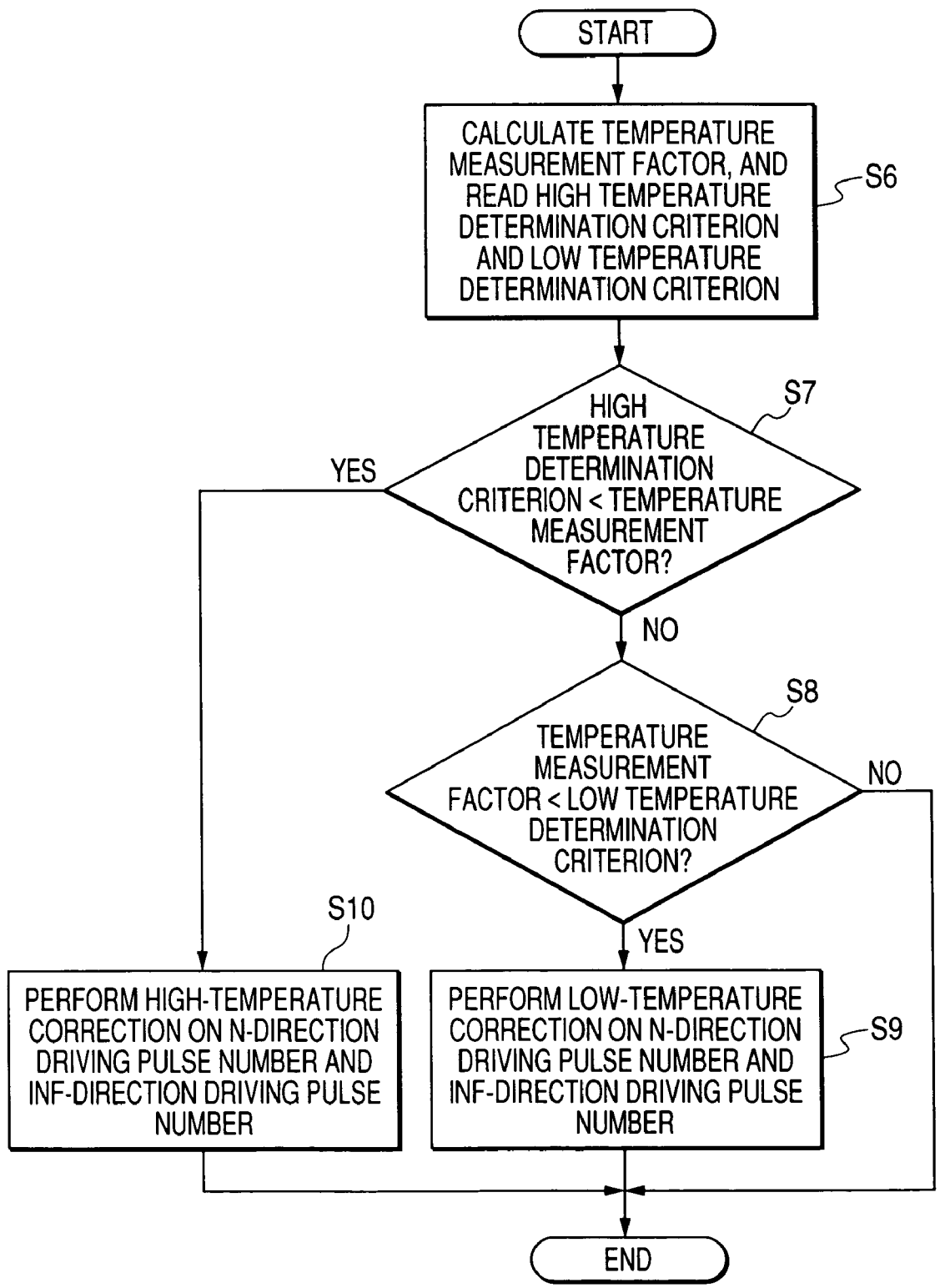
FIG. 5 is a flow diagram showing a temperature correction operation.

Meanwhile, in addition to the above-mentioned processing operation of FIG. 4, temperature correction shown in FIG. 5 may be performed. That is, in Step S6 of FIG. 5, the correction determining unit 35 calculates a temperature measurement factor D as a predetermined factor, which has correlation with a divergence between a driving pulse number and a reference pulse number on the basis of the following formula (5). Then, the correction determining unit 35 reads from the EEPROM 36 a high temperature determination criterion $E_H$ to be used as a criterion for determining whether or not it is necessary to perform high temperature correction and a low temperature determination criterion $E_L$ to be used as a criterion for determining whether or not it is necessary for perform low-temperature correction.

$$D = (P1_N + P1_{INF})/(P2_N + P2_{INF}) \tag{5}$$

Then, in the next Step S7, the correction determining unit 35 determines whether or not the calculated temperature measurement factor D is greater (i.e., it is necessary to perform high temperature correction) than the high temperature determination criterion $E_H$. If the correction determining unit 35 determines that the temperature measurement factor D is greater than the high temperature determination criterion $E_H$, the process proceeds to Step S10, as will be described below, where the high temperature correction is performed.

On the other hand, in Step S7, if the correction determining unit 35 determines that the temperature measurement factor D is below the high temperature determination criterion $E_H$, the process proceeds to Step S8 where the correction determining unit 35 determines whether or not the calculated temperature measurement factor D is smaller (i.e., it is necessary to perform low-temperature correction) than the low temperature determination criterion $E_L$. If the correction determining unit 35 determines that the temperature measurement factor D is smaller than the low temperature determination criterion $E_L$, the process proceeds to Step S9, as will be described below, where low-temperature correction is performed.

If the correction determining unit 35 determines that the temperature measurement factor D is greater than the low temperature determination criterion EL in Step S8, the processing of FIG. 5 is ended because it is not necessary to perform either high temperature correction or low-temperature correction.

Now, if the correction determining unit 35 determines that the temperature measurement factor D is greater than the high temperature determination criterion $E_H$ in Step S7, the driving pulse number correcting unit 34 performs high temperature correction on the N-direction driving pulse number $P4_N$ and the INF-direction driving pulse number $P4_{INF}$ in Step S10. For example, the driving pulse correcting unit 34 may perform high temperature correction by (i) reading pulse number adjustment values $F_N$ and $F_{INF}$ for high temperature correction in the N direction and the INF direction, which are obtained in advance and stored in the EEPROM 36, (ii) adding the pulse number adjustment value $F_N$ for high temperature correction in the N direction to the driving pulse number P4N, and (iii) adding the pulse number adjustment value $F_{INF}$ for high temperature correction in the INF direction to the driving pulse number $P4_{INF}$.

On the other hand, if the correction determining unit 35 determines that the temperature measurement factor D is smaller than the low temperature determination criterion $E_L$ in Step S8, the driving pulse number correcting unit 34 performs low-temperature correction on the N-direction driving pulse number $P4_N$ and the INF-direction driving pulse number $P4_{INF}$ in Step S9. For example, the driving pulse number correcting unit 34 may perform low-temperature correction by (i) reading pulse number adjustment value $G_N$ and $G_{INF}$ for low-temperature correction in the N direction and the INF direction, which are obtained in advance and stored in the EEPROM 36, (ii) adding the pulse number adjustment value $G_N$ for low-temperature correction in the N direction to the driving pulse number $P4_N$, and (iii) adding the pulse number adjustment value $G_{INF}$ for low-temperature correction in the INF direction to the driving pulse number $P4_{INF}$.

By performing correction according to a temperature change on the driving pulse number in this way, more highly-accurate driving control can be realized. In addition, Steps S6 to S8 of FIG. 5 may serve as a correction determining step, and Step S9 and Step S10 may serve as a temperature correcting step.

Figure 6:
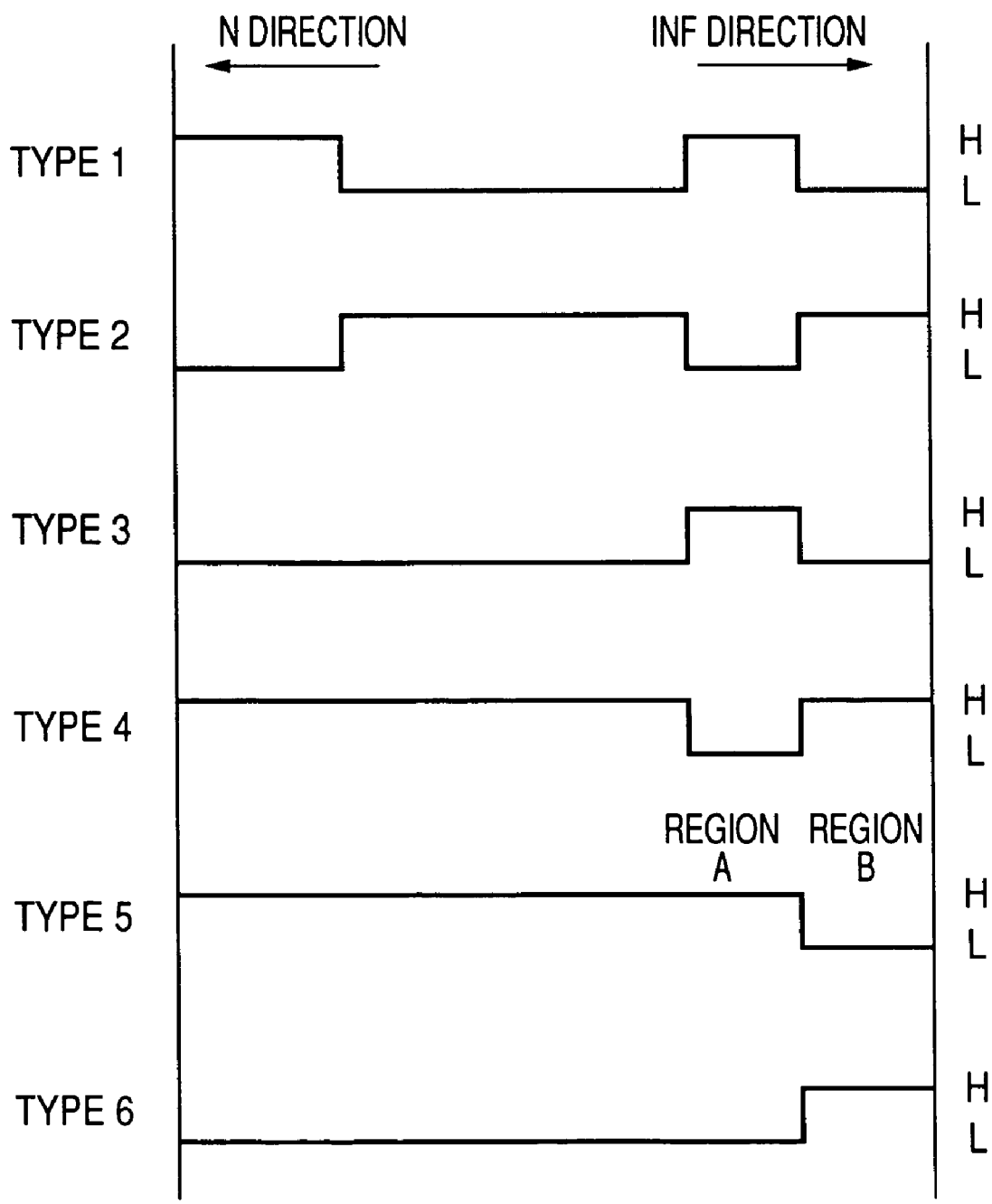
FIG. 6 is a graph showing variations of the output signal from the photo-interrupter to which the first embodiment may be applied.

Finally, variations of the PI output to which the first embodiment may be applied will be described. FIG. 6 shows Six types (Types 1 to 6) of the PI output to which the first embodiment may be applied. In Types 1 to 4 shown in FIG. 6, the actual driving pulse numbers (actual driving pulse numbers corresponding to the region A of FIG. 3) in the N direction and the INF-direction in the above-mentioned Step S1 of FIG. 4 can be measured by using a rising part and a falling part at both ends of the region A. Therefore, the first embodiment may be applied to Types 1 to 4.

On the other hand, in Types 5 and 6, there is either a rising part or a falling part. However, in Type 5, after switching (rising part) to the region A from the region B is detected, driving is made by a predetermined pulse number in the N direction. Thereafter, driving is made in the INF-direction. It is desirable to measure the driving pulse number $P1_{INF}$ from the start of this driving to detection of switching (falling part) to the region B from the region A. In this case, if the predetermined pulse number in the N direction is set to $P1_N$, the N-direction driving pulse number $P4_N$ and the INF-direction driving pulse number $P4_{INF}$ can be obtained according to the same procedure as that of FIG. 4. Even in Type 6, the N-direction driving pulse number $P4_N$ and the INF-direction driving pulse number $P4_{INF}$ can be obtained similarly. That is, the first embodiment may also be applied to Types 5 and 6.

In addition, although the example in which a lens serving as a driven member is driven is shown in the above first embodiment, the driven member is not limited to the lens. For example, the first embodiment may also be applied to the case where a cutting member of a machine tool, which requires high-precision positioning, is used as the driven member.

Second Embodiment

Meanwhile, JP Sho. 63-157578 A discloses a technique in which whenever a lens is moved by a predetermined driving pulse number in a predetermined direction, predetermined AF evaluation values (for example, contrast values) acquired from images captured through the lens are measured, a position where one of the AF evaluation values becomes the greatest is obtained and focusing of the lens is performed by moving the lens to this position is known in the related art. In JP Sho. 63-157578 A, since measuring points for the AF evaluation values are separated at predetermined intervals, an operation of returning the lens to a peak position having the greatest one of the AF evaluation values in the reverse direction after measurement (AF search) of the AF evaluation values in order to perform focusing with higher accuracy is performed.

However, JP Hei. 11-356070A (corresponding to U.S. Pat. No. 6,249,093; discussed in the "Background of the Invention" section) does not mention about the control of performing the above returning operation.

Moreover, in an automatic focusing device described in JP 2002-72073 A, the above AF search is performed by determining on the basis of a current position of a lens whether (i) the AF search is performed toward the nearest position after focus driving is once performed to infinity or (ii) the AF search is performed toward infinity after focus driving is once performed to the nearest position. Then, the lens is returned to a peak position having the greatest one of the AF evaluation values in the reverse direction after completion of the AF search. However, at the time of low luminance and/or low contrast, including the case where a photographic subject is dark, it is difficult to pinpoint a peak position of the AF evaluation and the accuracy of the AF search may become low.

The second embodiment provides a driving control device and a driving control method, which can realize the AF search with higher accuracy even at the time of low luminance and/or low contrast. The outline of the driving device 120 of the second embodiment is almost the same as the outline of the driving device 20 according to the first embodiment. That is, an example of an exploded perspective view of the driving device 120 becomes almost the same as that of FIG. 1. For this reason, the description based on the exploded perspective view of the driving device 120 is omitted.

[Functional Configuration of Driving Control Device]

Figure 7:
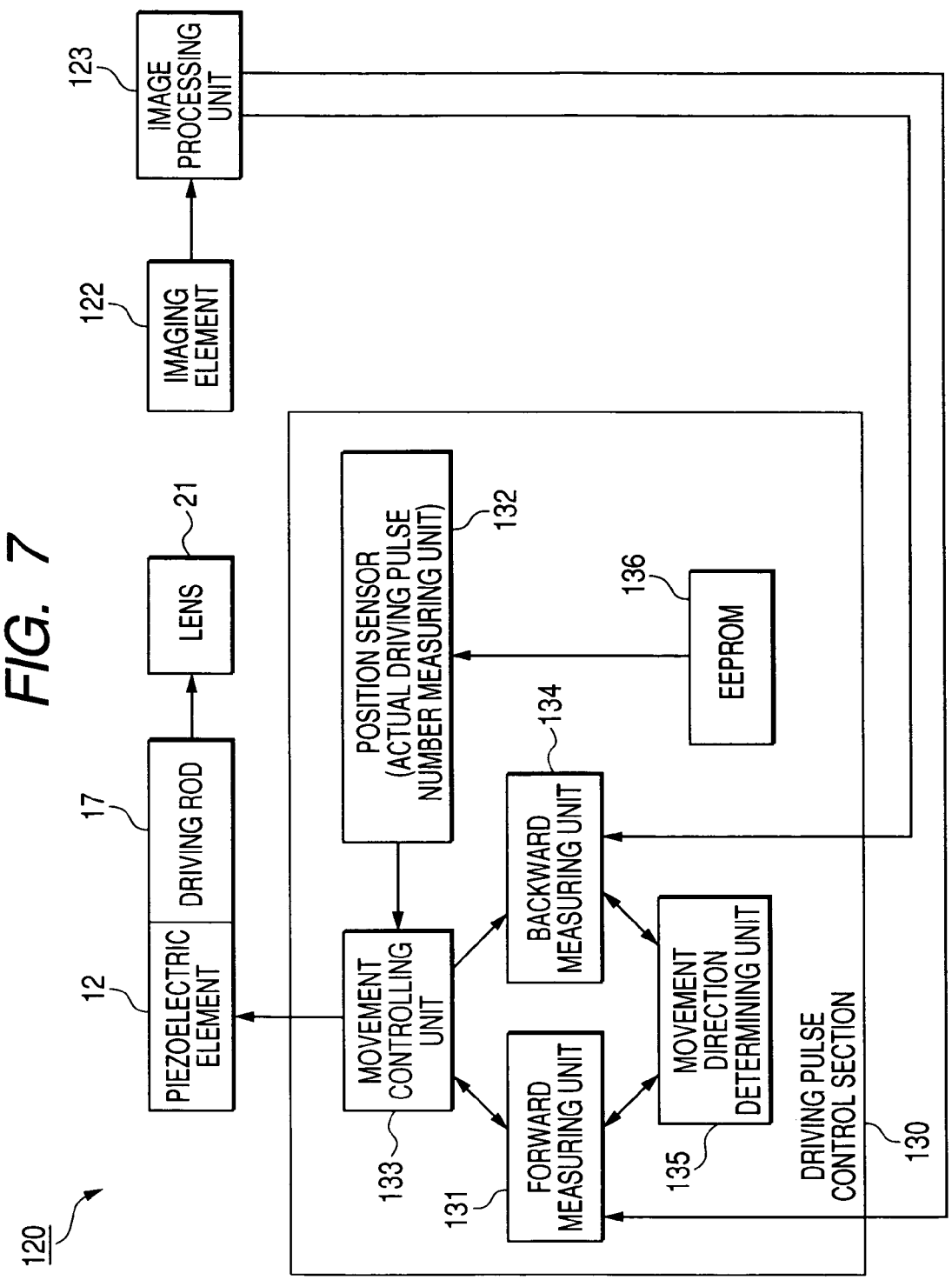
FIG. 7 is a functional block diagram of a driving control device 120 according to a second embodiment.

FIG. 7 shows a functional block diagram of the driving control device 120. As shown in FIG. 7, the driving control device 120 includes the lens 21, an imaging element 122, an image processing unit 123, the driving rod 17, the piezoelectric element 12 and a driving pulse control section 130. The lens 21 is built in the lens barrel 1 of FIG. 1. The imaging element 122 captures an image through the lens 21. The image processing unit 123 performs predetermined image processing on image data captured by the imaging element 122. The image processing unit 123 outputs the processed image data to a forward measuring unit 131 and a backward measuring unit 134, which will be described later. The driving rod 17 adjusts the position of the lens 21 along the direction of the optical axis. The piezoelectric element 12 is connected to the driving rod 17 to move the driving rod 17 along the direction of the optical axis. The driving pulse control section 130 controls supply of driving pulses to the piezoelectric element 12. Among these elements, the driving pulse control section 130 controls supply of driving pulses to cause the piezoelectric element 12 to expanded and contract so that the expansion rate of the piezoelectric element along the direction of the optical axis is different from the contraction rate of the piezoelectric element 12 along the direction of the optical axis, to thereby vibrate the driving rod 17 along the direction of the optical axis, and move the lens barrel 1 (and built-in lens 21), which frictionally engages with the driving rod 17 and includes the lens 21, in the N direction and the INF direction along the direction of the optical axis.

Moreover, the driving pulse control section 130 includes a photo-interrupter (not shown), which is known in related art, and includes a position sensor 132, which detects the position of the lens 21 on the basis of an output signal (hereinafter referred to as "PI output") from the photo-interrupter. The PI output, as shown in FIG. 3 as an example, is represented by a graph including a region A and a region D, which are H zones, and a region B and a region C, which are L zones. The position sensor 132 serves as an actual driving pulse number measuring unit, which measures a pulse number (a pulse number (hereinafter referred to as "actual driving pulse number") which is required to actually move the lens 21 by prescribed distance) corresponding to the region A of FIG. 3, with respect to the driving direction (here, the "N direction" of FIG. 3) of the lens 21 in the focusing operation of the lens 21, and a direction (i.e., the INF direction) opposite to the driving direction) before the focusing operation of the lens 21 is started.

In addition, the driving pulse control section 130 includes an EEPROM 136, the forward measuring unit 131, a movement controlling unit 133 (serving as a backward movement controlling unit), a backward measuring unit 134 and a movement direction determining unit 135. The EEPROM 136 stores various predetermined values, such as a predetermined pulse number (as will be described later), to be used by the position sensor 132, and reference pulse numbers (i.e., an N-direction reference pulse number $P2_N$ and an INF-direction reference pulse number $P2_{INF}$, which are obtained in advance in a room temperature with the normal position). The forward measuring unit 131 measures predetermined AF evaluation values acquired from images captured through the lens 21 whenever the lens 21 is moved, while moving the lens 21 a predetermined driving pulse number at a time in the driving direction (i.e., the N direction) in which the lens 21 is moved in the focusing operation of the lens 21. The movement controlling unit 133 controls supply of driving pulses on the basis of the measurement results by the position sensor 132 so as to move the lens 21 in the driving direction (i.e., the N direction) or the reverse direction (i.e., the INF direction). For example, the movement controlling unit 133 controls supply of driving pulses so as to return the lens 21 at high speed in the reverse direction (i.e., the INF direction) towards a position where a maximum value of the AF evaluation values is obtained by the forward measuring unit 131. The backward measuring unit 134 measures an AF evaluation value in the position which the lens 21 is returned to and stopped at by the movement controlling unit 133. Then, the backward measuring unit 134 further measures AF evaluation values whenever the lens 21 is moved while moving the lens 21 in the reverse direction (i.e., the INF direction) from the position by the predetermined driving pulse number a predetermined number of times. The movement direction determining unit 135 determines under a predetermined condition (which will be described later) whether the movement direction of the lens 21 at the time when AF evaluation values are measured again (re-measured) is either the driving direction or the reverse direction of the lens 21, from the maximum value of the AF evaluation values acquired by the forward measuring unit 131 and the respective AF evaluation values acquired by the backward measuring unit 134. In addition, the forward measuring unit 131 or the backward measuring unit 34 performs measurement again from a position to which the lens 21 is moved by the backward measuring unit 134 on the basis of the movement direction determined by the movement direction determining unit 135.

[Processing Operation in Driving Control Device]

Figure 8:
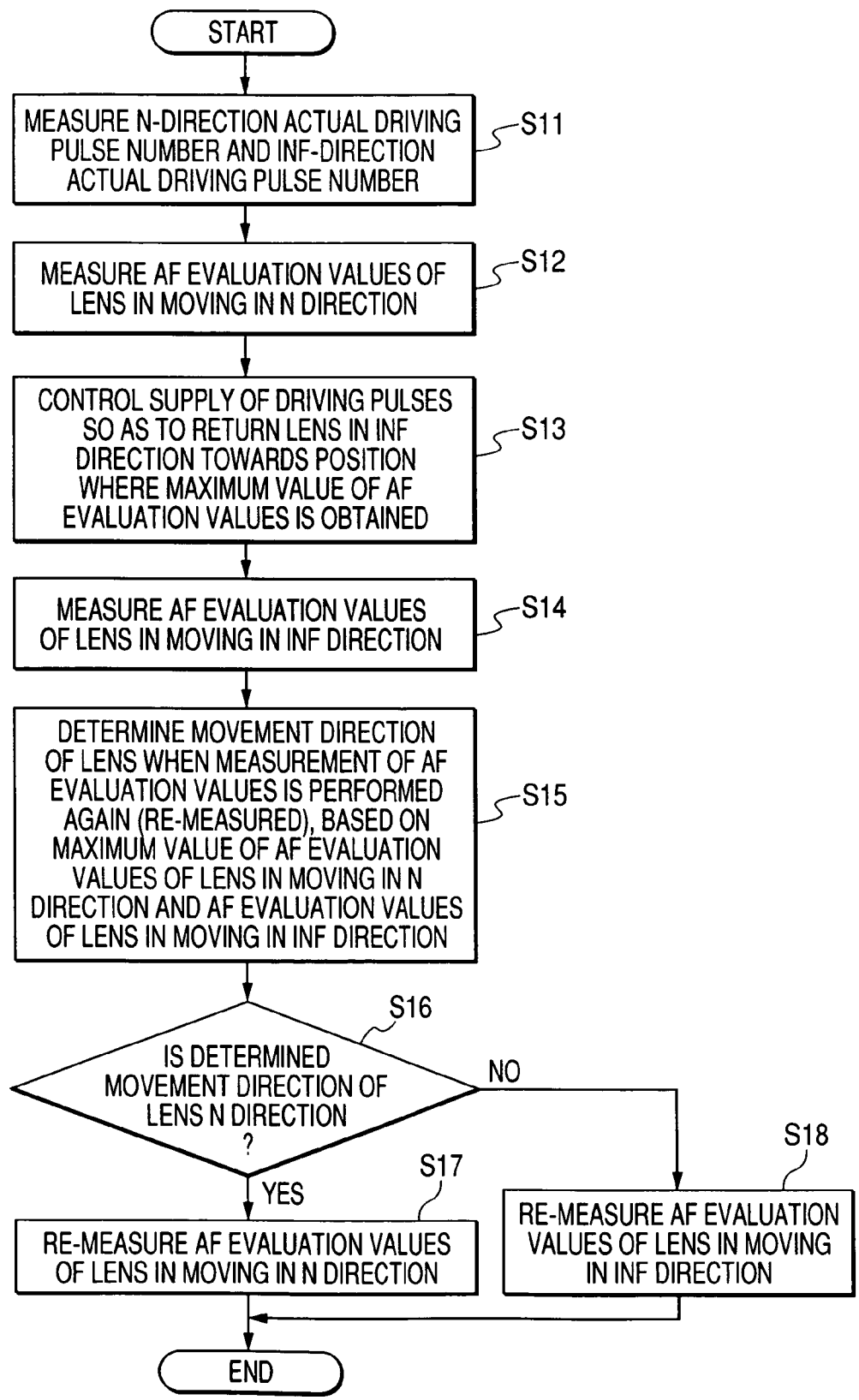
FIG. 8 is a flow diagram showing a processing operation in the driving control device 120.

Hereinafter, the processing operation performed in the driving control device 120 will be described. FIG. 8 shows a basic processing operation. As shown in FIG. 8, first, the position sensor 132 measures an actual driving pulse number corresponding to the region A of FIG. 3 with respect to each of the N direction and the INF direction before the start of focusing operation of the lens 21, in Step S11. That is, the position sensor 132 first measures an actual driving pulse number $P1_N$ in the N direction with respect to the region A of FIG. 3, and then measures an actual driving pulse number $P1_{INF}$ in the INF direction with respect to the region A. Since the details of Step S11 are almost the same as that of Step S1 (refer to FIG. 4) of the first embodiment, the description thereof is omitted.

Referring to FIG. 8, in the next Step S12, the forward measuring unit 131 measures predetermined AF evaluation values whenever the lens 21 is moved, while moving the lens 21 in the driving direction (i.e., the N direction) of the lens 21 by the predetermined driving pulse number. Then, in the next Step S13, the movement controlling unit 133 controls supply of the driving pulses so as to return the lens 21 at high speed in the reverse direction (i.e., the INF direction) towards the position where the maximum value of the AF evaluation values is obtained by the forward measuring unit 131. The operation of returning the lens 21 in the reverse direction will be described in detail later.

In the next Step S14, the backward measuring unit 134 measures an AF evaluation value in the position where the lens 21 is stopped as a result of being returned by the movement controlling unit 133. Then, the backward measuring unit 134 further measures AF evaluation values whenever the lens 21 is moved while moving the lens 21 in the reverse direction (i.e., the INF direction) from the position by the predetermined driving pulse number a predetermined number of times. If all the acquired AF evaluation values are smaller than a predetermined value (i.e., maximum value VP of the acquired AF evaluation values/ determination factor J), this case is considered as an error. Then, in the next Step S15, the movement direction determining unit 135 determines under the predetermined condition (which will be described later) whether the movement direction of the lens 21 at the time when AF evaluation values are measured again (re-measured) is either the driving direction of the lens 21 or the reverse direction, from the maximum value of the AF evaluation values acquired by forward measuring unit 131 and the respective AF evaluation values acquired by the backward measuring unit 134.

In the next Step S16, if the determined movement direction is the driving direction (i.e., the N direction), the movement direction determining unit 135 instructs the forward measuring unit 131 to perform re-measurement. Then, the process proceeds to Step S17. On the other hand, if the determined movement direction is the reverse direction (i.e., the INF direction), the movement direction determining unit 135 instructs the backward measuring unit 134 to perform re-measurement. Then, the process proceeds to Step S18.

In Step S17, the forward measuring unit 131 performs the above-mentioned measurement again from the position to which the lens 21 is moved by the backward measuring unit 134. Also, in Step S18, the backward measuring unit 134 performs the above-mentioned measurement again from the position to which the lens 21 is moved by the backward measuring unit 134. If a maximum value is obtained in the re-measurement, arithmetic interpolation centering on the maximum value is performed. Then, the lens 21 is moved to a position corresponding to the maximum value obtained by the arithmetic interpolation. In addition, after Step S17 or Step S18, the process may return to Step S12.

In addition, Step S12 of FIG. 8 may serve as a forward measuring step, Step S13 may serve as a backward movement controlling step, Step S14 may serve as the backward measuring step, and Step S15 may serve as a movement direction determining step. Moreover, Step S16 and S17 and Step S16 and S18 may serve as a re-measuring step. In addition, since there is variation in luminance for every frame measured by the forward measuring unit 131 and the backward measuring unit 134 immediately after power is supplied to the driving control device 120, Step S12 and S14 are performed after this variation is stabilized.

Figure 9A:
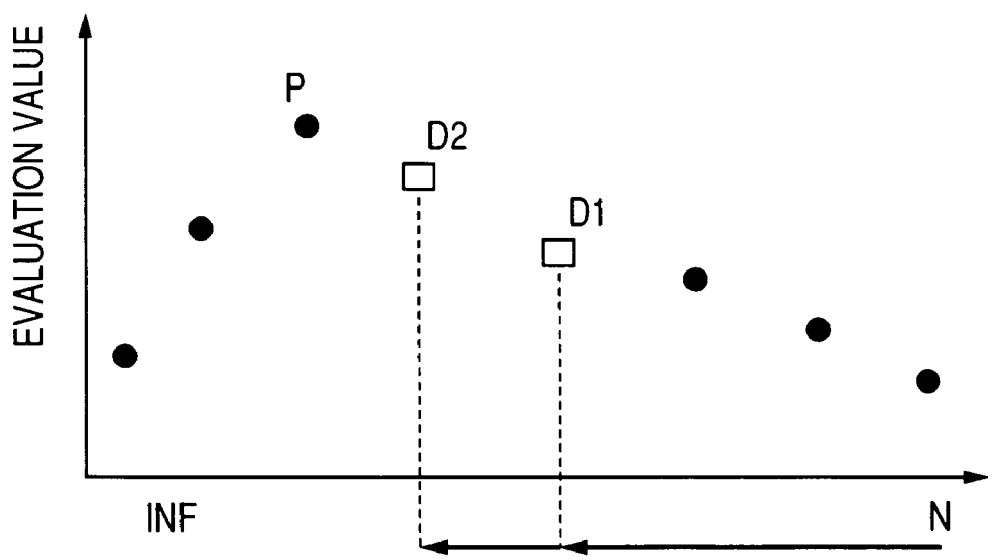
FIG. 9 is a graph showing the relationship between a movement direction of a lens, and AF evaluation values as focal points.
Figure 9B:
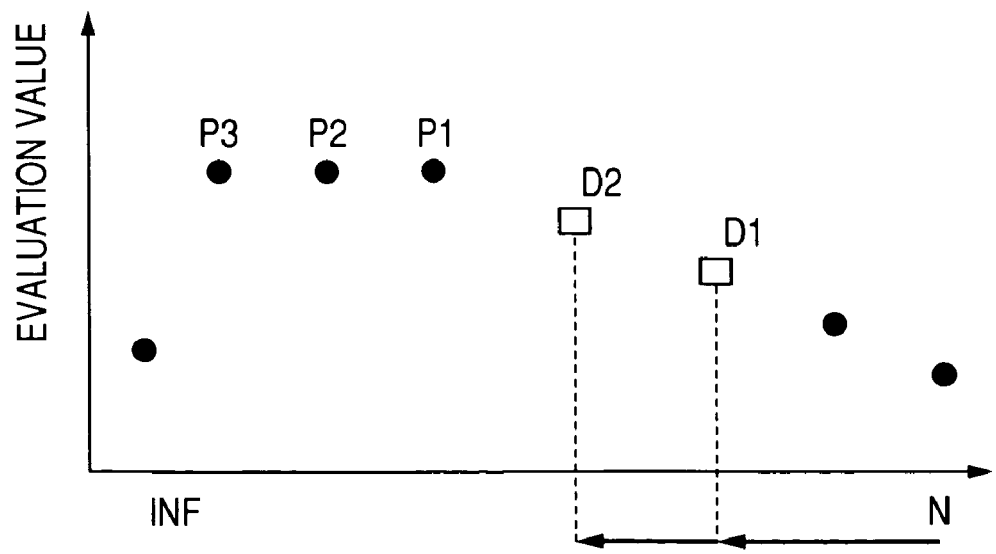

Next, referring to FIG. 9, an example in which the movement controlling unit 133 controls supply of the driving pulses so as to return the lens 21 in the reverse direction (i.e., the INF direction) towards the position where the maximum value of the AF evaluation values is obtained by the forward measuring unit 131. FIG. 9 is a graph showing the relationship between a direction (abscissa axis) in which the lens 21 is moved by the processing operation performed by the movement controlling unit 133, and AF evaluation values (ordinate axis), which are focal points when the focal points are detected. In addition, although it is assumed that the above-mentioned predetermined number of times is equal to 1, this embodiment is not particularly limited thereto. FIG. 9A is a graph showing the case where a single maximum value of the AF evaluation values is obtained in the measurement by the forward measuring unit 131. FIG. 9b is a graph showing the case where three continuous maximum values (all have the same value) are obtained. As shown in FIG. 9A, it is assumed that the lens 21 moves in the reverse direction (i.e., the INF direction) (S13 of FIG. 8) towards the position (i.e., P) where the maximum value of the AF evaluation values is obtained, and stops at a second measuring point (i.e., D1) just after the position P. In addition, P is a position within a focus driving range of the lens 21 where the maximum value of the AF evaluation values is obtained. If an AF evaluation value in D1 is measured, then the lens 21 will move further in the reverse direction (i.e., the INF direction) to D2, and an AF evaluation value in D2 is measured (S14 of FIG. 8).

Next, as shown in FIG. 9B, the case where two or more continuous maximum values are obtained will be described. Here, the case where three maximum values are obtained will be described. In addition, a position at which a maximum value is obtained and which is nearest to the N-direction side is defined as P1. It is assumed that P2 and P3 are continuously arranged in order in the INF direction from P1. In such a case, it is assumed that the lens 21 is moved in the reverse direction (i.e., the INF direction) towards the position (i.e., P1) nearest to the N-direction side (S13 of FIG. 8), and is stopped at the second measuring point (i.e., D1) just after the position P1. The operation of the movement controlling unit 133 after this is the same as the above-mentioned one.

Figure 11:
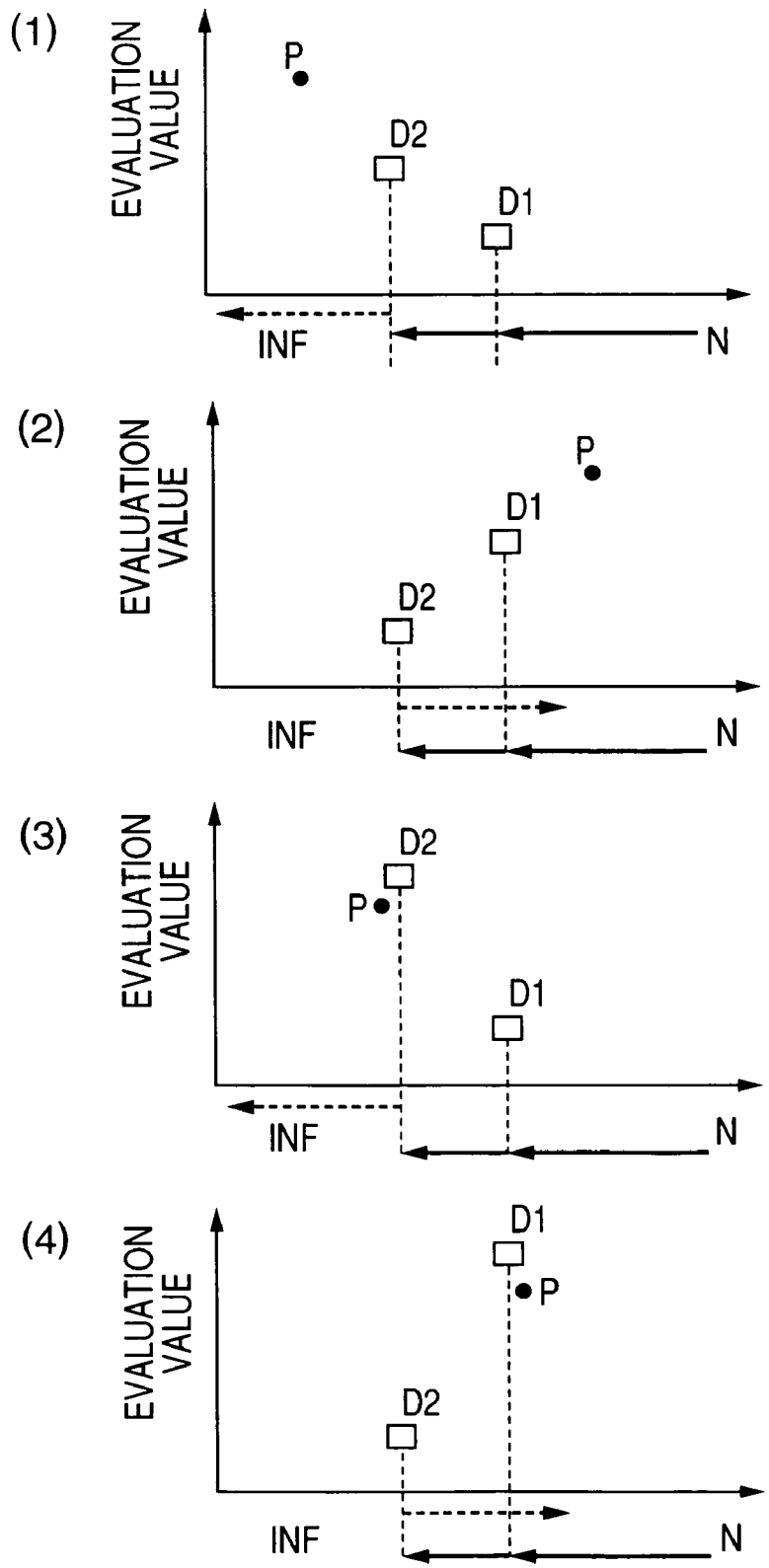
FIG. 11 is a graph showing the relationship between a movement direction of a lens, and AF evaluation values as focal points.

Next, with reference to FIGS. 10 and 11, described will be the conditions under which the movement direction determining unit 135 determines the movement direction of the lens 21, which is used when AF evaluation values are measured again (re-measured), from the maximum value of the AF evaluation values acquired by the forward measuring unit 131 and the respective AF evaluation values acquired by the backward measuring unit 34. FIG. 10 shows the conditions under which the movement direction determining unit 135 determines the movement direction of the lens 21. Moreover, FIG. 11 is a graph showing the relationship between the movement direction (abscissa axis) of the lens 21 and AF evaluation values (ordinate axis), which correspond to the conditions shown in FIG. 10, respectively. In addition, a position at which the lens 21 is stopped as a result of being returned by the movement controlling unit 133 is defined as the position D1. Moreover, the maximum value of AF evaluation values is defined as VP, an AF evaluation value acquired again in D1 is defined as VD1, and an AF evaluation value acquired again in D2 is defined as VD2.

As shown in FIG. 10, there are four conditions (Nos. 1 to 4) under each of which determine the movement direction. No. 1 represent the case where the lens 21 is stopped in a position nearest to the second measuring point just after a position (i.e., peak position P) where the maximum value of the AF evaluation values is obtained. Moreover, Nos. 2 to 4 respectively represents the case where the lens 21 is stopped in a position nearest to the first measuring point just after the peak position P, the case where the lens 21 is stopped in a position nearest to the first measuring point just before the peak position, and the case where the lens is stopped in a position nearest to the peak position. First, the condition of No. 1 will be described. If VP is greater than VD2 and VD2 is greater than VD1, the movement direction of the lens 21 is determined as the INF direction as shown in FIG. 11 (1). Then, on the basis of the INF direction, re-measurement of AF evaluation values is performed from the position D2. Next, the condition of No. 2 will be described. If VP is greater than VD1 and VD1 is greater than VD2, the movement direction of the lens 21 is determined as the N direction as shown in FIG. 11 (2). Then, on the basis of the N direction, re-measurement of AF evaluation values is performed from the position D2. Next, the condition of No. 3 will be described. If VD2 is greater than VP and VP is greater than VD1, the movement direction of the lens 21 is determined as the INF direction as shown in FIG. 11 (3). Then, on the basis of the INF direction, re-measurement of AF evaluation values is performed from the position of D2. Next, the conditions of No. 4 will be described. If VD1 is greater than VP and VP is greater than VD2, the movement direction of the lens 21 is determined as the N direction as shown in FIG. 11 (4). Then, on the basis of the N direction, re-measurement of AF evaluation values is performed from the position D2.

As mentioned above, the movement direction of the lens, which is used when measurement of AF evaluation values is performed again (re-measured), is determined as either the driving direction or the reverse direction, from the maximum value of the AF evaluation values acquired in moving the lens 21 in the driving direction (i.e., N direction) and the respective AF evaluation values acquired in moving the lens in the reverse direction (i.e., INF-direction). Then, AF evaluation values are measured again (re-measured). Accordingly, this further ensures pinpointing of a peak position of the AF evaluation values. Therefore, the AF search with higher accuracy can be realized even at the time of low luminance and/or low contrast.

In addition, for example, portable optical apparatuses, such as a cellular phone unit with a camera and a digital camera, may include the driving control device 120. In a portable optical apparatus including a camera module and a power source module, the camera module may include the driving control device 120. In this case, the power source module may control ON/OFF of a power source of the camera module. This makes it possible to realize the AF search with higher accuracy even at the time of low luminance and/or low contrast in such a portable optical apparatus. As a result, the convenience when photographing, etc. is performed using such a portable optical apparatus can be enhanced.

Third Embodiment

It is indispensable to specify the driving conditions in detail in the case where focus driving of a lens is performed for shortening the driving time required for execution of the focus driving. These driving conditions are not specified in JP Hei. 11-356070A (corresponding to U.S. Pat. No. 6,249, 093). Moreover, in a focusing method described in JP 2004-77959A (corresponding to US 2004/0212721A), focus driving in which the driving range of a lens is wide is necessarily performed twice for every single depression of a shutter button. Therefore, it would be difficult to shorten the driving time required for execution of the focus driving.

The third embodiment provides a driving control device, a portable optical apparatus, and a driving control method, which can shorten the driving time required for execution of the focus driving of a lens. The outline of the driving device 220 according to the third embodiment is almost the same as the outline of the driving device 20 according to the first embodiment. That is, an example of an exploded perspective view of the driving device 220 becomes almost the same as that of FIG. 1. For this reason, the description based on the exploded perspective view of the driving device 220 is omitted.

[Functional Configuration of Driving Control Device]

Figure 12:
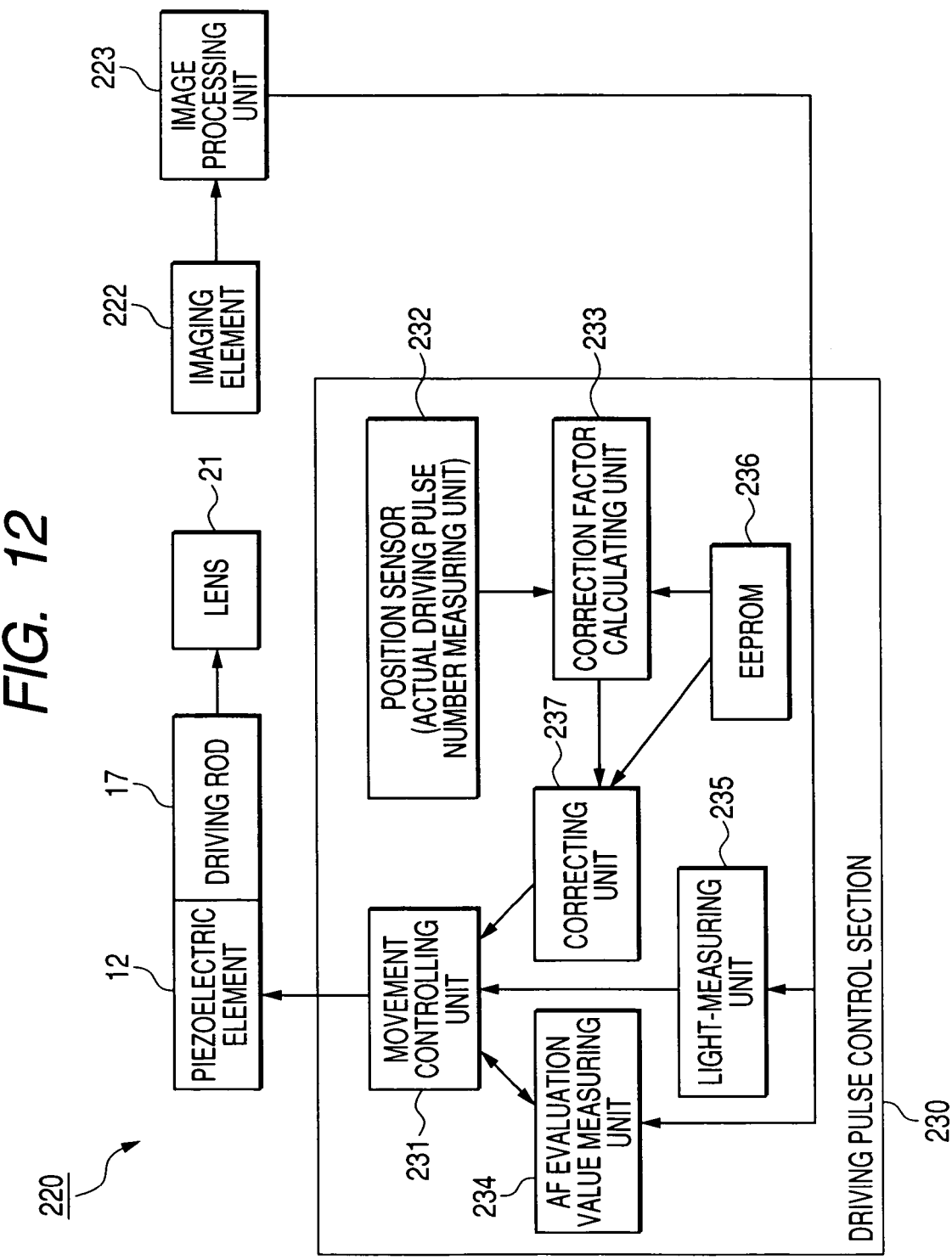
FIG. 12 is a functional block diagram of a driving control device 220 according to a third embodiment.

FIG. 12 shows a functional block diagram of the driving control device 220. As shown in FIG. 12, the driving control device 220 includes the lens 21, an imaging element 222, an image processing unit 223, the driving rod 17, the piezoelectric element 12 and a driving pulse control section 230. The lens 21 is built in the lens barrel 1 of FIG. 1. The imaging element 222 captures an image through the lens 21. The image processing unit 223 performs predetermined image processing on image data captured by the imaging element 122. The image processing unit outputs the processed image data to an AF evaluation value measuring unit 234 and a light-measuring unit 235, which will be described later. The driving rod 17 adjusts a position of the lens 21 along the direction of the optical axis. The piezoelectric element 12 is connected to the driving rod 17 to move the driving rod 17 along the direction of the optical axis. The driving pulse control section 230 controls supply of driving pulses to the piezoelectric element 12. Among these elements, the driving pulse control section 230 controls supply of the driving pulses to cause the piezoelectric element 12 to expanded and contract so that the expansion rate of the piezoelectric element along the direction of the optical axis is different from the contraction rate of the piezoelectric element 12 along the direction of the optical axis, to thereby vibrate the driving rod 17 along the direction of the optical axis and move the lens barrel 1 (and built-in lens 21), which frictionally engages with the driving rod 17 and includes the lens 21, in the N direction and the INF direction.

Moreover, the driving pulse control section 230 includes a photo-interrupter (not shown), which is known in related art, and includes a position sensor 232, which detects the position of the lens 21 on the basis of an output signal (hereinafter referred to as "PI output") from the photo-interrupter. The PI output, as shown in FIG. 3 as an example, is represented by a graph including a region A and a region D, which are H zones, and a region B and a region C, which are L zones. The position sensor 132 serves as an actual driving pulse number measuring unit, which measures a pulse number (a pulse number (hereinafter referred to as "actual driving pulse number") which is required to actually move the lens 21 by a predetermined distance) corresponding to the region A of FIG. 3 with respect to each of the driving direction (here, the N direction of FIG. 3) of the lens 21 in the focusing operation thereof, and a direction (i.e., the INF direction) opposite to the driving direction) before the start of the focusing operation of the lens 21.

In addition, the driving pulse control section 230 includes an EEPROM 236, a correction factor calculating unit 233, the AF evaluation value measuring unit 234, a correcting unit 237, a movement controlling unit 231 and the light-measuring unit 235. The EEPROM 236 stores in advance various predetermined values, such as a reference pulse number R for calculation of a correction factor M as will be described later and a movement pulse number L which is used to return the lens 21 in the reverse direction or the driving direction from a position where a maximum value of AF evaluation values (as will be described later) is obtained to a starting position of re-measurement of AF evaluation values. The correction factor calculating unit 233 calculates the correction factors M for correcting the relationship between the driving pulse number and the traveling distance of the lens 21, on the basis of actual driving pulse numbers Q, which are obtained by measurement and predetermined reference pulse numbers R, with the reverse direction or the driving direction. The AF evaluation value measuring unit 234 measures predetermined AF evaluation values (here, contrast values) acquired from images captured through the lens 21 whenever the lens 21 is moved while moving the lens 21 in the predetermined driving direction in the focusing operation of the lens 21 or the predetermined reverse direction by a predetermined driving pulse number at a time. Furthermore, after the lens 21 is returned in the reverse direction or the driving direction by the movement controlling unit 231 as will be described later, the AF evaluation value measuring unit 234 performs measurement again from the position to which the lens 21 is returned. The correcting unit 237 corrects a movement pulse number L corresponding to the traveling distance from the position where the maximum value of the AF evaluation values acquired by the measurement is obtained to the starting position of re-measurement by the AF evaluation value measuring unit 234, on the basis of the calculated correction factor M, to thereby obtain a pulse number S for re-measurement. The movement controlling unit 231 controls supply of the driving pulses to the piezoelectric element 12 on the basis of the pulse number S for re-measurement obtained in the correction by the correcting unit 237 so as to return the lens 21 in the reverse direction or the driving direction from the position where the maximum value of the AF evaluation values acquired in the measurement by the AF evaluation value measuring unit 234 is obtained in cases where predetermined conditions are satisfied (specifically, (i) the case where the previous measurement by the AF evaluation value measuring unit 234 is successful, (ii) the case where the time, which has elapsed since the time of success of the previous measurement by the AF evaluation value measuring unit 234, is within predetermined time, and (iii) the case where either a first condition that a change in an AF evaluation value acquired at the time of the measurement success is within a first predetermined range or a second condition that a change in the luminance obtained by measurement by the light-measuring unit 135 at the time of the measurement success is within a second predetermined range is satisfied). The light-measuring unit 135 measures the luminance of a photographic subject.

[Processing Operation in Driving Control Device]

Figure 13:
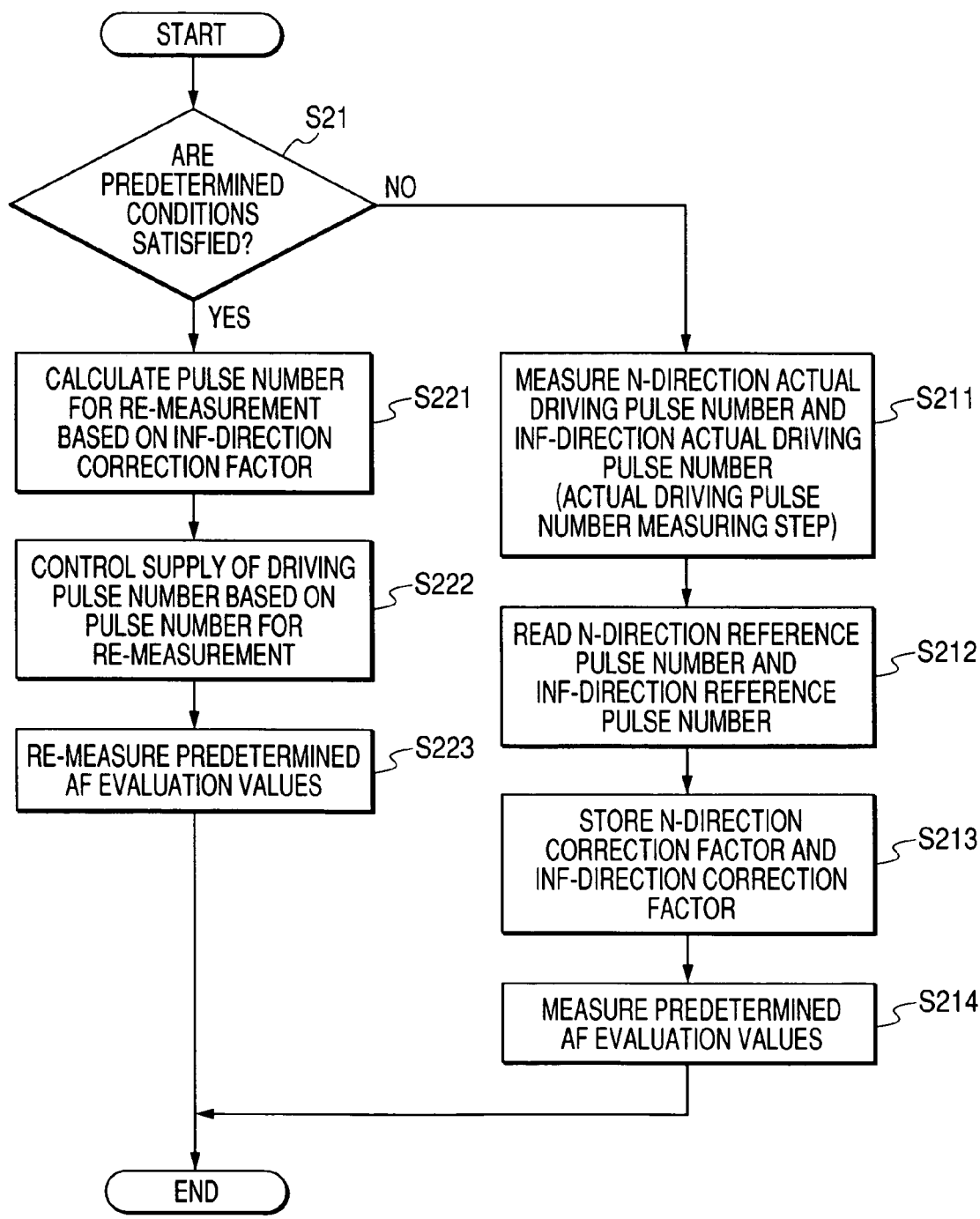
FIG. 13 is a flow diagram showing a processing operation in the driving control device 220.

Hereinafter, the processing operation in the driving control device 220 will be described. FIG. 13 shows a basic processing operation. As shown in FIG. 13, in Step S21, the movement controlling unit 231 first determines whether or not the above-mentioned predetermined conditions are satisfied. If the above-mentioned predetermined conditions are satisfied, the process proceeds to Step S21. On the other hand, if measurement has failed at the time of the previous measurement (occurrence of a measurement error), if the time which has elapsed since the time of success of the previous measurement exceeds the predetermined range, or if an AF evaluation value acquired at the time of success of the previous measurement changes to such an extent that it exceeds the predetermined range and the luminance obtained at the time of success of this measurement changes to such an extent that it exceeds the predetermined range due to changes in AF detection information and luminance information, the predetermined conditions are not satisfied. Therefore, the process proceeds to Step S211.

In FIG. 13, in Step S211, the position sensor 232 measures actual driving pulse numbers, which correspond to the region A of FIG. 3 with respect to each of the N direction and the INF direction before the start of the focusing operation of the lens 21. That is, the position sensor 232 first measures the actual driving pulse number in the N direction with respect to the region A of FIG. 3, and then measures the actual driving pulse number in the INF direction with respect to the region A. The detail of Step S211 is almost the same as that of Step S1 (refer to FIG. 4) of the first embodiment. For this reason, the description thereof is omitted.

In FIG. 13, in the next Step S212, the correction factor calculating unit 233 reads from the EEPROM 36 INF-direction and N-direction reference pulse numbers R, which are obtained in advance in a room temperature with the normal position. In the next Step S213, the correction factor calculating unit 233 calculates an INF-direction correction factor M for correcting the relationship between the driving pulse number and the traveling distance of the lens 21, on the basis of the following formula (6), an INF-direction actual driving pulse number Q, and the INF-direction reference pulse number R. Similarly, the correction factor calculating unit 233 calculates an N-direction correction factor M for correcting the relationship between the driving pulse number and the traveling distance of the lens 21, on the basis of the following formula (6), an N-direction actual driving pulse number Q, and the N-direction reference pulse number R.

$$M=Q/R \qquad (6)$$

In the next Step S214, the AF evaluation value measuring unit 234 measures predetermined AF evaluation values (here contrast values) acquired from images captured through the lens 21 whenever the lens 21 is moved while moving the lens 21 in the predetermined driving direction (i.e., the N direction) by a predetermined driving pulse number for the sake of the focusing operation of the lens 21. Here, the N-direction correction factor M calculated in the above Step S213 is used.

In FIG. 13, in Step S221, the correcting unit 237 reads from the EEPROM 36 the movement pulse number L (i.e., a pulse number, which returns the lens 21 in the reverse direction (i.e., the INF direction)) and which corresponds to the traveling distance from a position where a maximum value of the AF evaluation values obtained by the measurement is obtained to a starting position of re-measurement by the AF evaluation value measuring unit 234. Then, the correcting unit 237 corrects the movement pulse number L to obtain the pulse number S for re-measurement on the basis of the following formula (7) and the calculated INF-direction correction factor M.

$$S=L \times M \qquad (7)$$

Then, in the next Step S222, the movement controlling unit 231 controls supply of the driving pulses to the piezoelectric element 12 on the basis of the above-mentioned pulse number S for re-measurement so as to return the lens 21 in the reverse direction (i.e., the INF direction) from the position where a maximum value of the AF evaluation values acquired in the measurement is obtained. Here, the INF-direction correction factor M calculated in the above Step S213 is used. Then, in Step S223, the AF evaluation value measuring unit 234 performs measurement again from the position to which the lens 21 is returned. Here, the N-direction correction factor M calculated in the above Step S213 is used.

This causes the lens 21 to be returned in the reverse direction (i.e., the INF direction) from the position where the maximum value of the AF evaluation values is obtained on the basis of the pulse number S for re-measurement. Then, predetermined AF evaluation values is measured from the position to which the lens 21 is returned. For this reason, the traveling distance of the lens 21 is shorter in the case where the lens 21 is returned in the reverse direction (i.e., the INF direction) on the basis of the pulse number S for re-measurement than in the case where the lens is returned to a starting position of the focusing operation. Therefore, the driving range of the lens 21 can be narrowed. As a result, the driving time required for execution of the focus driving of the lens 21 can be shortened. In particular, as the position where a maximum value of the AF evaluation values is obtained is nearer to the starting position of re-measurement of AF evaluation values (that is, as P5 is nearer to the INF-direction side), the traveling distance of the lens 21 moved by the movement controlling unit 231 becomes shorter. Therefore, the driving time required for execution of the focus driving of the lens 21 can be further shortened.

In addition, Step S211 of FIG. 13 may serve as an actual driving pulse number measuring step, Steps S212 to S213 may serve as a correction factor calculating step, Step S214 may serve as an AF evaluation value measuring step, Step S221 may serve as a correcting step, Step S222 may serve as a movement controlling step, and Step S223 may serve as a re-measuring step. Here, Step S211 is performed immediately after power is supplied to the driving control device 220, and when the focus driving of the lens 21 is performed for the first time after power is supplied to the driving control device. However, Step S212 to S214 may be further performed thereafter. In addition, since there is variations in luminance for respective frames measured by the AF evaluation value measuring unit 234 immediately after power is supplied to the driving control device 220, Step S211 is performed after this variation is stabilized.

Figure 14A:
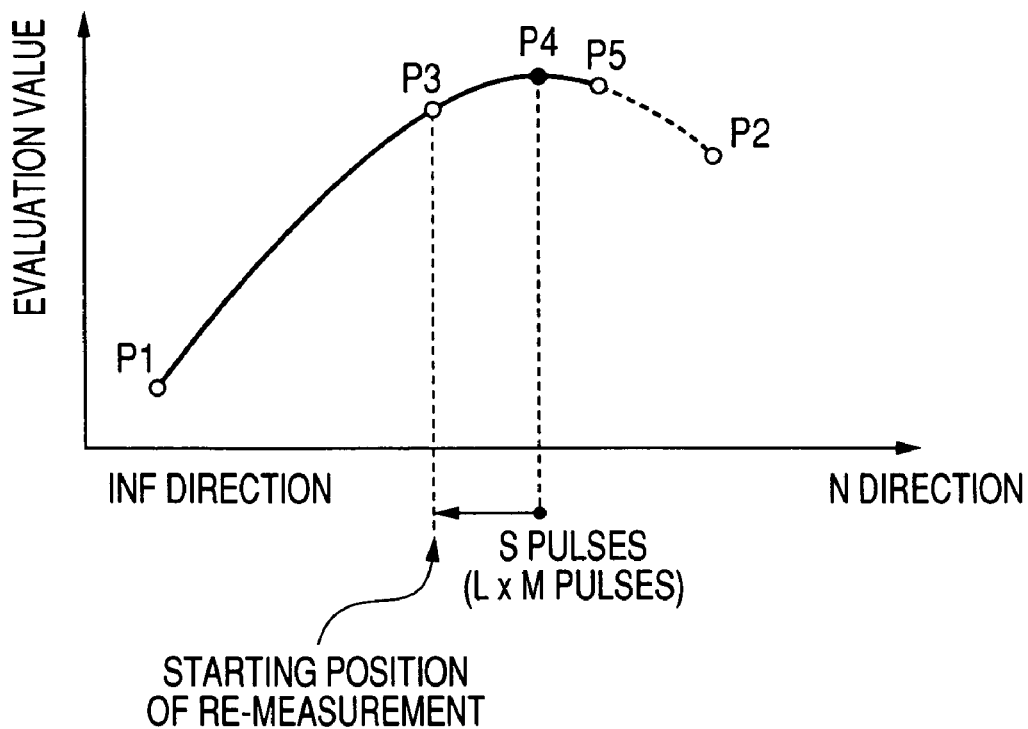
FIG. 14 is a graph showing the relationship between a movement direction of a lens, and AF evaluation values as focal points.
Figure 14B:
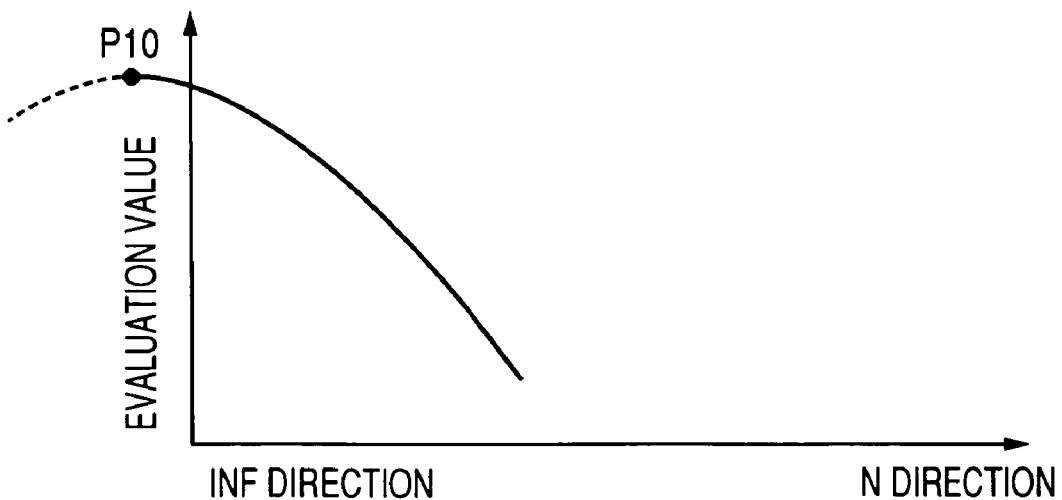

FIG. 14 is graphs showing the relationship between the direction in which the lens 21 is moved by the processing operation performed by the movement controlling unit 231, and AF evaluation values, which are focal points when the focal point are detected. FIG. 14A is a graph showing the case where a maximum value is obtained in the measurement by the AF evaluation value measuring unit 234. FIG. 14B is a graph showing the case where there is no maximum value of AF evaluation values within a focus driving range of the lens 21. As shown in FIG. 14A, first, in order to measure AF evaluation values, the lens 21 moves from P1 toward P2 in the N direction via P3 and P4 in order (S214 of FIG. 13). Here, the N-direction correction factor M calculated in the above Step S213 is used. In addition, it is assumed that the focus driving range of the lens 21 is P1 to P2. Here, when the lens 21 reaches P5, AF evaluation values begin to fall. For this reason, P4 is detected as a position where a maximum value of the AF evaluation values within the focus driving range of the lens 21 is obtained. At this time, the lens 21 is stopped at P5. Then, the lens 21 moves to P4 in order to adjust a focal point. Next, if the above-mentioned predetermined conditions are satisfied, the lens 21 moves towards P3 from P4 in the INF direction (S222 of FIG. 13). Here, the INF-direction correction factor M calculated in the above Step S213 is used. P3 is a position to which the lens is returned from P4 in the INF direction on the basis of the pulse number S (=L×M) for re-measurement. That is, P3 is a starting position of re-measurement of AF evaluation values by the AF evaluation value measuring unit 234. Next, the lens 21 moves to P5 via P4 towards P2 from P3 in order to measure AF evaluation values again (S223 of FIG. 13). Here, the N-direction correction factor M calculated in the above Step S213 is used. Then, in order to adjust a focal point again, the lens 21 moves to P4. Here, the INF-direction correction factor M calculated in the above Step S113 is used. In addition, after the lens 21 has moved to P4 in order to adjust a focal point, the movement controlling unit 231 may move the lens 21 in the N direction on the basis of the pulse number S for re-measurement. In this case, after this movement is completed, measurement of AF evaluation values is performed by the AF evaluation value measuring unit 234 while the lens 21 is moved in the INF direction.

Here, in the above measurement of AF evaluation values, as shown in FIG. 14B, the case where there is no maximum value (P10) of the AF evaluation values within the focus driving range of the lens 21 is regarded as occurrence of a measurement error and is determined that the conditions in S11 of FIG. 13 are not satisfied.

In addition, for example, a portable optical apparatus called a cellular phone unit with a camera may include the driving control device 220. More specifically, in a portable optical apparatus including a camera module, a communication/speech module, and a power source module, this camera module may include the driving control device 220. In this case, the power source module may control ON/OFF of a power source of the camera module. Since this shortens the driving time required for execution of the focus driving of the lens 21 even in such a portable optical apparatus, the convenience when photographing, etc. is performed using such a portable optical apparatus can be enhanced.

Moreover, the first to third embodiments may be combined arbitrarily within the scope of the invention as will be obvious to those skilled in the art. Furthermore, the first to third embodiments and combinations thereof may be improved within the scope of the invention as will be obvious to those skilled in the art as long as they do not damage the purports of the invention.

What is claimed is:

1. A driving control device comprising:
    an electro-mechanical converting element that expands and contracts along a predetermined direction;
    a driving member fixed to an end of the electro-mechanical converting element in the predetermined direction; and
    a driving pulse control section that controls supply of driving pulses to the electro-mechanical converting element, wherein:
    the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move a driven member, which frictionally engages with the driving member, in two directions including one direction along the predetermined direction and an opposite direction to the one direction, and
    the driving pulse control section comprises:
        an actual driving pulse number measuring unit that measures actual driving pulse numbers, which are respectively required to actually move the driven member by a predetermined movement amount in the two directions, before a positioning operation for positioning the driven member is started;
        a correction factor calculating unit that calculates correction factors for correcting a relationship between a driving pulse number and a traveling distance of the driven member with respect to the respective two directions, based on the actual driving pulse numbers obtained by the measurement and a predetermined reference pulse number; and
        a driving pulse number correcting unit that corrects an element driving pulse number, which is supplied to the electro-mechanical converting element so as to move the driven member, based on the calculated correction factors for the respective two directions.

2. The driving control device according to claim 1, wherein:
    the driving pulse control section further comprises:
        a correction determining unit that determines whether or not it is necessary to correct the driving pulse number according to a temperature change, based on a predetermined reference value and a predetermined factor, which has a correlation with a divergence between the actual driving pulse numbers and the predetermined reference pulse number, which is obtained from the actual driving pulse numbers with respect to the respective two directions and the predetermined reference pulse number, and
    the driving pulse number correcting unit corrects the element driving pulse number according to a predetermined temperature change when the correction determining unit determines that it is necessary to correct the driving pulse number according to the temperature change.

3. The driving control device according to claim 1, wherein:
    the driven member comprises a lens, and
    the predetermined direction is an optical axis direction of the lens.

4. The driving control device according to claim 2, wherein:
    the driven member comprises a lens, and
    the predetermined direction is an optical axis direction of the lens.

5. A driving control method for use in a driving control device comprising:
- an electro-mechanical converting element that expands and contracts along a predetermined direction;
- a driving member fixed to an end of the electro-mechanical converting element in the predetermined direction; and
- a driving pulse control section that controls supply of driving pulses to the electro-mechanical converting element, wherein:
- the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move a driven member, which frictionally engages with the driving member, in two directions including one direction along the predetermined direction and an opposite direction to the one direction, the driving control method comprising:
- measuring, by the driving pulse control section, actual driving pulse numbers, which are respectively required to actually move the driven member by predetermined movement amount in the two directions before a positioning operation for positioning the driven member is started;
- calculating, by the driving pulse control section, correction factors for correcting a relationship between the driving pulse number and a traveling distance of the driven member with respect to the respective two directions, based on the actual driving pulse numbers obtained by the measuring and a predetermined reference pulse number; and
- correcting, by the driving pulse control section, an element driving pulse number, which is supplied to the electro-mechanical converting element so as to move the driven member, based on the calculated correction factors for the respective two directions.

6. The driving control method according to claim 5, further comprising:
- determining, by the driving pulse control section, whether or not it is necessary to correct the driving pulse number according to a temperature change, based on a predetermined reference value and a predetermined factor, which has a correlation with a divergence between the actual driving pulse numbers and the predetermined reference pulse number, which is obtained from the actual driving pulse numbers with respect to the respective two directions and the predetermined reference pulse number; and
- correcting, by the driving pulse control section, the element driving pulse number according to a predetermined temperature change when it is determined that it is necessary to correct the driving pulse number according to the temperature change.

7. A driving control device comprising:
- an electro-mechanical converting element that expands and contracts along a predetermined direction;
- a driving member fixed to an end of the electro-mechanical converting element in the predetermined direction; and
- a driving pulse control section that controls supply of driving pulses to the electro-mechanical converting element, wherein:
- the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens,
- the driving pulse control section comprises:
  - a forward measuring unit that measures predetermined AF evaluation values acquired from images captured through the lens whenever the driven member is moved, while moving the driven member by a predetermined driving pulse number at a time in a driving direction in which the driven member is moved in a focusing operation of the lens;
  - a backward movement controlling unit that controls the supply of driving pulses so as to return the driven member in a reverse direction towards a position where a maximum value of the AF evaluation values is obtained by the forward measuring unit;
  - a backward measuring unit that measures an AF evaluation value in a position which the driven member is returned to and stopped at by the backward movement controlling unit, the backward measuring unit that measures AF evaluation values whenever the driven member is moved while moving the driven member from the position in the reverse direction by the predetermined driving pulse number a predetermined number of times; and
  - a movement direction determining unit that determines under a predetermined condition whether a movement direction of the driven member, which is to be used when AF evaluation values are measured again, is either the driving direction or the reverse direction, based on the maximum value of the AF evaluation values acquired by the forward measuring unit and the AF evaluation values acquired by the backward measuring unit, and
- the forward measuring unit or the backward measuring unit performs measurement again based on the determined movement direction from a position to which the backward measuring unit has moved the driven member.

8. A driving control method for use in a driving control device comprising:
- an electro-mechanical converting element that expands and contracts along a predetermined direction;
- a driving member fixed to an end of the electro-mechanical converting element in the predetermined direction; and
- a driving pulse control section that controls supply of driving pulses to the electro-mechanical converting element, wherein:
- the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens, the driving control method comprising:

measuring, by the driving pulse control section, predetermined AF evaluation values acquired from images captured through the lens whenever the driven member is moved, while moving the driven member by a predetermined driving pulse number at a time in a driving direction in which the driven member is moved in a focusing operation of the lens;

controlling, by the driving pulse control section, the supply of driving pulses so as to return the driven member in a reverse direction towards a position where a maximum value of the AF evaluation values is obtained in the measuring;

measuring, by the driving pulse control section, an AF evaluation value in a position which the driven member is returned to and stopped at;

measuring, by the driving pulse control section, AF evaluation values whenever the driven member is moved while moving the driven member from the position in the reverse direction by the predetermined driving pulse number a predetermined number of times;

determining, by the driving pulse control section, under a predetermined condition whether a movement direction of the driven member, which is to be used when AF evaluation values are measured again, is either the driving direction or the reverse direction, based on the maximum value of the AF evaluation values acquired in the measuring of the AF evaluation values while moving the driven member in the driving direction and the AF evaluation values acquired in the measuring of the AF evaluation values while moving the driven member in the reverse direction, and measuring, by the driving pulse control section, the AF evaluation value again whenever the driven member is moved while moving the driven member in the determined movement direction by the predetermined pulse number at a time from a position to which the driven member has been moved in the measuring of the AF evaluation value while moving the driven member in the reverse direction.

9. A driving control device comprising:

an electro-mechanical converting element that expands and contracts along a predetermined direction;

a driving member fixed to an end of the electro-mechanical converting element in the predetermined direction; and a driving pulse control section that controls supply of driving pulses to the electro-mechanical converting element, wherein:

the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens, the driving pulse control section comprises:

an actual driving pulse number measuring unit that measures an actual driving pulse number, which is required to actually move the driven member by a predetermined traveling distance in a reverse direction opposite to a driving direction of the driven member for a focusing operation of the lens, before the focusing operation of the lens is started;

a correction factor calculating unit that calculates a correction factor for correcting a relationship between a driving pulse number and a traveling distance of the driven member with respect to the reverse direction, based on the actual driving pulse number obtained by the measurement and a predetermined reference pulse number;

an AF evaluation value measuring unit that measures predetermined AF evaluation values acquired from images captured through the lens whenever the driven member is moved while moving the driven member in the driving direction by a predetermined driving pulse number at a time in the driving direction for the focusing operation of the lens;

a correcting unit that corrects a movement pulse number corresponding to a traveling distance from a position where a maximum value of the AF evaluation values acquired by the measurement is obtained to a position where the AF evaluation value measuring unit starts to re-measure, based on the correction factor calculated by the correction factor calculating unit, to thereby obtain a pulse number for re-measurement;

a light-measuring unit that measures a luminance of a photographic subject; and a movement controlling unit that controls the supply of the driving pulses so as to return the driven member in the reverse direction from the position where the maximum value of the AF evaluation values acquired by the measurement by the AF evaluation value measuring unit is obtained based on the pulse number for re-measurement obtained in the correcting by the correcting unit when a previous measurement by the AF evaluation value measuring unit has succeeded; a time, which has elapsed since success of the previous measurement by the AF evaluation value measuring unit, is within a predetermined time; and a at least one of a first condition that a change in an AF evaluation value acquired at the time of the measurement success is within a first predetermined range and a second condition that a change in the luminance obtained by measurement by the light-measuring unit at the time of the measurement success is within a second predetermined range is satisfied, and the AF evaluation value measuring unit measures the predetermined AF evaluation values again from a position to which the driven member is returned after the driven member has been returned in the reverse direction by the movement controlling unit.

10. A portable optical apparatus comprising the driving control device according to claim 9.

11. A driving control method for use in a driving control device including:

an electro-mechanical converting element that expands and contracts along a predetermined direction;

a driving member fixed to an end of the electro-mechanical converting element in the predetermined direction; and a driving pulse control section that controls supply of driving pulses to the electro-mechanical converting element, wherein:

the driving pulse control section controls the supply of driving pulses to cause the electro-mechanical converting element to expand and contract so that an expansion rate of the electro-mechanical converting element along the predetermined direction is different from a contraction rate of the electro-mechanical converting element along the predetermined direction, to thereby vibrate the driving member along the predetermined direction and move along the predetermined direction a driven member, which frictionally engages with the driving member and comprises a lens, the driving control method comprising:

measuring, by the driving pulse control section, an actual driving pulse number, which is required to actually move the driven member by a predetermined traveling distance in a reverse direction opposite to a driving direction of the driven member for a focusing operation of the lens, before the focusing operation of the lens is started;

calculating, by the driving pulse control section, a correction factor for correcting a relationship between a driving pulse number and a traveling distance of the driven member with respect to the reverse direction, based on the actual driving pulse number obtained in the measuring and a predetermined reference pulse number;

measuring, by the driving pulse control section, predetermined AF evaluation values acquired from images captured through the lens whenever the driven member is moved while moving the driven member in the driving direction by a predetermined driving pulse number at a time in the driving direction for the focusing operation of the lens;

correcting, by the driving pulse control section, a movement pulse number corresponding to a traveling distance from a position where a maximum value of the AF evaluation values acquired in the measuring of the AF evaluation values is obtained to a position where re-measuring of the AF evaluation value measuring unit is started, based on the correction factor calculated in the calculating, to thereby obtain a pulse number for re-measurement;

measuring, by the driving pulse control section, a luminance of a photographic subject; and controlling, by the driving pulse control section, the supply of the driving pulses so as to return the driven member in the reverse direction from the position where the maximum value of the AF evaluation values acquired in the measuring of the AF evaluation values is obtained based on the pulse number for re-measurement obtained in the correcting when a previous measuring of the AF evaluation value has succeeded; a time, which has elapsed since success of the previous measuring of the AF evaluation value, is within a predetermined time; and a at least one of a first condition that a change in an AF evaluation value acquired at the time of the measurement success is within a first predetermined range and a second condition that a change in the luminance obtained in the measuring of the luminance at the time of the measurement success is within a second predetermined range is satisfied; and measuring, by the driving pulse control section, the predetermined AF evaluation values again from a position to which the driven member is returned after the driven member has been returned in the reverse direction in the controlling.

\* \* \* \* \*